(12) United States Patent
Ueno

(10) Patent No.: US 6,496,213 B1
(45) Date of Patent: Dec. 17, 2002

(54) MULTI-BEAM CONTROL METHOD

(75) Inventor: Toshiyuki Ueno, Kawasaki (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 96 days.

(21) Appl. No.: 09/664,320

(22) Filed: Sep. 18, 2000

(30) Foreign Application Priority Data

Sep. 28, 1999 (JP) .......................................... 11-274880

(51) Int. Cl.⁷ ................................................. B41J 2/435
(52) U.S. Cl. ...................................... 347/234; 347/248
(58) Field of Search ................................ 347/235, 243, 347/234, 248, 250, 241, 256; 358/481, 474, 296

(56) References Cited

U.S. PATENT DOCUMENTS 5,995,246 A * 11/1999 Komiya et al. ............. 358/481
6,188,424 B1 * 2/2001 Komiya et al. ............. 347/235

FOREIGN PATENT DOCUMENTS

| EP | 0 827 326 A2 | * 3/1998 | .......... H04N/1/047 |
| JP | 10-76704 | 3/1998 | |
| JP | 2000-147398 | 5/2000 | |

* cited by examiner

Primary Examiner—Hai Pham
(74) Attorney, Agent, or Firm—Foley & Lardner

(57) ABSTRACT

When the sub-scanning beam position does not fall within a target range by the last directive value, the drift direction of a galvanomirror is estimated on the basis of the last directive value. A directive value is provided to the galvanomirror and then changed so that the sub-scanning beam position is shifted in the estimated direction in steps from the position corresponding to the last directive value. A decision is then made as to whether the directive value in the galvanomirror has reached a predetermined value. When the predetermined value is reached, the galvanomirror is directed to shift the beam position in the direction opposite to the estimated direction in steps from the position corresponding to the last directive value. As a result, a great load is prevented from being imposed on the galvanomirror during the laser beam sub-scanning direction position control.

13 Claims, 17 Drawing Sheets

GALVANOMIRROR OPERATION SPECIFICATIONS

| | MINIMUM | AVERAGE | MAXIMUM |
|---|---|---|---|
| CHANGE IN IMAGE PLANE POSITION FOR 1 BIT ($\mu$m/bit) | 1.23 | 1.76 | 2.22 |
| MAXIMUM DISTANCE MOVED BY IMAGE PLANE (mm) | 12.11 | 17.36 | 21.86 |
| SWING ANGLE FOR 1 BIT ($\mu$rad/bit) | 6.22 | 8.92 | 11.23 |
| MAXIMUM SWING ANGLE OF GALVANOMIRROR | 55.04 | 74.98 | 99.38 |

MULTI-BEAM CONTROL METHOD

CROSS-REFERENCE TO RELATED APPLICATIONS

This application is based upon and claims the benefit of priority from the prior Japanese Patent Application No. 11-274880, filed Sep. 28, 1999, the entire contents of which are incorporated herein by reference.

BACKGROUND OF THE INVENTION

The present invention relates to an image formation apparatus which forms an image using multiple laser beams and more specifically to a multi-beam control method for controlling the positions in the sub-scanning direction of the laser beams on a photosensitive drum with galvanomirrors and an image formation apparatus which uses the control method.

A multi-beam optical system is equipped with a plurality of laser beam sources and a single polygon mirror and is required to perform beam position control in order to prevent image misalignment due to the relative displacement of beams in the image plane. In this specification, "beam position" refers to the position of each beam in the sub-scanning direction that is scanned across the image plane, such as the surface of the photosensitive drum, in the main scanning direction.

Methods of controlling the positions of beams in the sub-scanning direction include a method of setting the spacing between each beam through the use of a plurality of galvanomirrors each having its reflecting surface (mirror) arranged to be rotatable in any direction as disclosed in, for example, Japanese Unexamined Patent Publication No. 10-76704 and Japanese Unexamined Patent Application No. 2000-147398.

In the sub-scanning control in the multi-beam optical system, coarse adjustment is made first. The coarse adjustment is intended to, when a beam is greatly off a target course and hence does not pass over a photosensor, in which case beam fine adjustment can not be made, shift the beam over the photosensor.

In general, in the coarse adjustment, a directive value, for example, a lower limiting directive value, is set in the galvanomirror and then the setting value is changed in large steps toward an upper limiting directive value to shift the transit position of a beam in the sub-scanning direction. For example, a step size of 100 bits results in a change of 176 $\mu$m in the image plane position. As shown in FIGS. 17A and 17B, a beam reflected by the galvanomirror is directed onto the surface of the photosensitive drum to form a latent image on it. The latent image is developed and then transferred onto paper. The sensor surface and the paper surface are set equidistant from the galvanomirror. The amount by which the beam position is displaced on the sensor surface appears on paper as it is. Thus, the beam position on the sensor surface is also called the image plane position.

FIG. 18 is a flowchart for the conventional coarse adjustment. This coarse adjustment is made automatically by the apparatus. First, of four beams, a beam to be adjusted is turned on (step S110). Next, a determination is made as to whether horizontal synchronization (HSYNC) is established (step S101). If established, then the coarse adjustment of the next beam is made.

If synchronization is not detected in step S101, then a lower limiting directive value is first set in the galvanomirror so that it is turned below the image plane at the maximum swing angle and then the setting value is increased in steps of 100 bits (corresponding to about 176 $\mu$m) (step S106).

The above operation is repeated until HSYNC has been established for all the beams. The control is repeated in the order of, for example, beam 1, beam 2, beam 3, beam 4, beam 1 and so on. If there are beams for which adjustment has been made, they are skipped and the control is repeated in the order of, for example, beam 1, beam 3, beam 4, beam 1 and so on. When, even if the setting value is changed until the upper limiting value is reached, no HSYNC is detected, repair is needed. In this case, the necessity for service call is displayed on the apparatus.

After the termination of the coarse adjustment for all the beams, fine adjustment is made. FIG. 19 is a flowchart for the conventional fine adjustment. The fine adjustment is made to drive the beam which has been allowed to pass over the sensor surface by the coarse adjustment into a target range of ±10 $\mu$m of a target value. The fine adjustment is essential in obtaining correct output images.

As with the coarse adjustment, only a beam to be controlled is turned on (step S110). The beam position information in the sensor is read (step S111). A determination is made as to whether the position over which the beam passes is within the target range (step S112). If the beam position lies within the target range, then the adjustment is terminated; otherwise, the galvanomirror is instructed so as to change the beam position on the sensor surface in small steps, thereby driving the beam position into the target range (step S113).

FIG. 20 shows a plot of output versus input of the galvanomirror. The input to the galvanomirror is given in voltage. Voltages from −10.6 to +10.6V are made correspond to 0EB8H to 3333H in hexadecimal notation. These hexadecimal numbers are handled as input values to the galvanomirror. These input values are converted into voltages by a D/A converter and then applied to the galvanomirror. The input values below 0EB8H or above 3333H correspond to voltages in the vicinity of supply voltages (±12V). For these input values, the output of the A/D converter is not proportional to the input. Thus, these input values are not generally used.

That is, 1 bit corresponds to an input voltage of 16 mV. The output is given in swing angles of the galvanomirror from −39.46 mrad to +39.46 mrad. In correspondence to these swing angles, the image plane position changes from −8.68 mm to +8.68 mm. Namely, when the input value is changed by 1 bit, the beam position on the image plane is changed by 1.76 $\mu$m.

For countermeasures against the galvanomirror being heated, the use of 5% portions of the driving range at both ends thereof is prohibited by software. Thus, the actual input ranges from −10.1 to +10.1 V and the output ranges from −37.49 to +37.49 mrad (the amount by which the image plane position is changed from −8.25 to +8.25 mm).

FIG. 21 illustrates the direction of operation of the galvanomirror, variations in the beam direction, and input data (0EB8H to 3146H) and input voltages (−10.1 to +10.1V) to the galvanomirror. When the input value is changed from 0EB8H to 3146H, the input voltage changes from −10.1V to +10.1V and the direction of the beam changes upward by 74.98 mrad.

The galvanomirrors have characteristics that greatly vary from galvanomirror to galvanomirror. As shown in FIG. 22, the amount by which the image plane position is changed per unit change (1 bit) in the input varies from 1.23 to 2.22 $\mu$m, the maximum distance moved by the image plane varies from 12.11 to 21.86 mm, the swing angle per unit change in the input varies from 6.22 to 11.23 μrad, and the maximum swing angle varies from 55.04 to 99.38 mrad. Thus, the galvanomirrors contain an individual difference of about ±30% in their characteristics.

The time of response to input of a directive value greatly varies from galvanomirror to galvanomirror if only the mixing ratio of dumping materials varies slightly. FIGS. 23, 24 and 25 show response characteristics when the mixing ratio is 1:1.1, 1:1.2, and 1:1.3, respectively. The time (mS) is shown on the horizontal axis and the amount (μm) by which the image plane position is changed is shown on the vertical axis. A change in the image plane position about 10 mS, the data sampling interval in conventional control, after the galvanomirror has been given a directive value is about 130 μm in FIG. 23, about 100 μm in FIG. 24, and about 80 μm in FIG. 25. It will therefore be seen that a little change in the mixing ratio results in variations in the response characteristic of the galvanomirror.

In Japanese Unexamined Patent Application No. 2000-147398, the galvanomirror used in sub-scanning control is composed of a magnet fixing base, a magnet, a bobbin, a yoke, a coil, a torsion bar, and a mirror. The mirror and the torsion bar are glued together at four points. For this reason, a great movement of the mirror may result in the glue peeling off and the reduced life of the galvanomirror.

The problems with the conventional control are listed below.

Problem 1

In the conventional control, since the maximum voltage (−10.1V) is applied to the galvanomirror, the load on the galvanomirror increases.

Problem 2

The coarse adjustment is made in order to search for the sensor which should be able to be found with close to the directive value (close to 0V) used in the last control. However, the lower limiting value (−10.1V) is set in the galvanomirror and the beam is then moved in units of 100 bits until it comes to pass over the sensor. That is, the conventional control method is performed in such a way as to search for a nearby object from the distance, which involves waste of time.

Problem 3

The conventional control is not performed so as to accommodate the individual difference among galvanomirrors in the change in the image plane position per unit change (1 bit) in the directive value. That is, the same control is performed on a galvanomirror for which the change in the image plane position per unit change in the input is a minimum of 1.23 μm and a galvanomirror for which the change in the image plane position per unit change in the input is a maximum of 2.22 μm. For example, when an attempt is made to move the image plane position by 176 μm (corresponding to 100 bits for the average product), the change in the image plane position is as small as 123 μm for the minimum product and as large as 222 μm for the maximum product. Thus, further movement is needed in either case, involving waste of time. In addition, with the maximum product, there is the possibility that the image plane may jump over its target position and become uncontrollable.

Problem 4

The conventional control is not performed so as to accommodate the individual difference among galvanomirrors in the response time since a directive value was applied. That is, the same control is performed on a galvanomirror for which the degree of achievement about 10 mS after a directive value has been given is 80%, a galvanomirror which is 70% in the degree of achievement, and a galvanomirror which is 60% in the degree of achievement. For example, if control is performed on the assumption that the degree of achievement is 70% and the actual degree of achievement is 80% or 60%, then overshoot or shortage of movement will occur, which requires further movement and involves waste of time.

Problem 5

As described above, with the conventional control, since the characteristics of individual galvanomirrors, such as the change in the image plane position per unit change in an input directive value and the response time, are unknown, the time of control cannot be estimated and a large time margin has to be ensured. In general, after having been warmed up, the drum continues rotating during control of the optical system, resulting in increased idle running time of it.

BRIEF SUMMARY OF THE INVENTION

It is therefore a first object of the present invention to prevent a heavy load from being imposed on galvanomirrors during laser beam sub-scanning direction position control.

It is a second object of the present invention to eliminate useless control during laser beam sub-scanning direction position control.

It is a third object of the present invention to perform a control operation to conform to differences among galvanomirrors in change in the image plane position to thereby reduce the required control time.

It is a fourth object of the present invention to perform a control operation to conform to differences among galvanomirrors in response time to thereby reduce the required control time.

It is a fifth object of the present invention to grasp the differences among galvanomirrors, reduce margin in galvanomirror control, and reduce the required time of control.

In order to achieve the above objects, according to one aspect the present invention, there is provided a method for controlling the sub-scanning direction beam position, for use with an image forming apparatus including multiple laser sources, a single polygon mirror, galvanomirrors, and a laser beam position detecting optical sensor, comprising the steps of: controlling the galvanomirror with the last galvanomirror directive value when sub-scanning beam position control was performed in the last operation of the image forming apparatus; a first decision step of deciding whether the sub-scanning direction beam position has reached a target range by referring to an output value of the sensor; estimating the drift direction of the galvanomirrors on a basis of the last directive value, when the sub-scanning direction beam position has not reached the target range with the last directive value; providing directive values to the galvanomirror so that the sub-scanning direction beam position is moved in steps from the position controlled by the last directive value in the estimated direction; determining whether the directive value provided to the galvanomirror has reached a predetermined value; and providing directive values to the galvanomirror so that the sub-scanning direction beam position is moved in steps from the position controlled by the last directive value in the direction opposite to the estimated direction, when the directive value have reached the predetermined value.

Thus, when the beam position does not fall within a target range, the beam is shifted always in either plus or minus direction from the directive value in the last operation, preventing a heavy load from being imposed on the galvanomirrors. A drift in the last operation is estimated and the beam is shifted from the direction to correct the drift, thus eliminating useless control during the beam sub-scanning direction position control.

According to another aspect the present invention, there is provided a method for controlling the sub-scanning direction beam position, for use with an image forming apparatus including multiple laser sources, a single polygon mirror, galvanomirrors, and a laser beam position detecting optical sensors, comprising the steps of: measuring an movement amount of a beam after predetermined directive value has been provided to the galvanomirror at regular time intervals using changes in outputs of the sensors; determining a final movement amount of the beam and response times of the galvanomirror for the directive value from the measurements of the movement amount of the beam; and controlling the beam position in the sub-scanning direction using the final movement amount of the beam and the response times.

Further, the step of controlling the beam position includes a step of making fine adjustment of the beam position, and the fine adjustment step further includes a step of turning on a beam to be controlled and scanning the beam in the main scanning direction, a step of deciding the sub-scanning direction position of the beam by reading the outputs of the optical sensors, a step of, when the sub-scanning direction position is not within a target range, calculating a specific directive value on the basis of the final movement amount of the beam for the directive value and providing the specific directive value to the corresponding galvanomirror, and a step of deciding the sub-scanning direction position of the beam to be controlled after the response time for fine adjustment since the specific directive value was provided to the galvanomirror.

Thus, the movement amount and the response time for the directive value are determined for each galvanomirror and, using the movement amount and the response time, the fine adjustment of the beam position is made. Therefore, the control time can be reduced, the total control time can be estimated, and the overall efficiency of the beam control can be increased.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
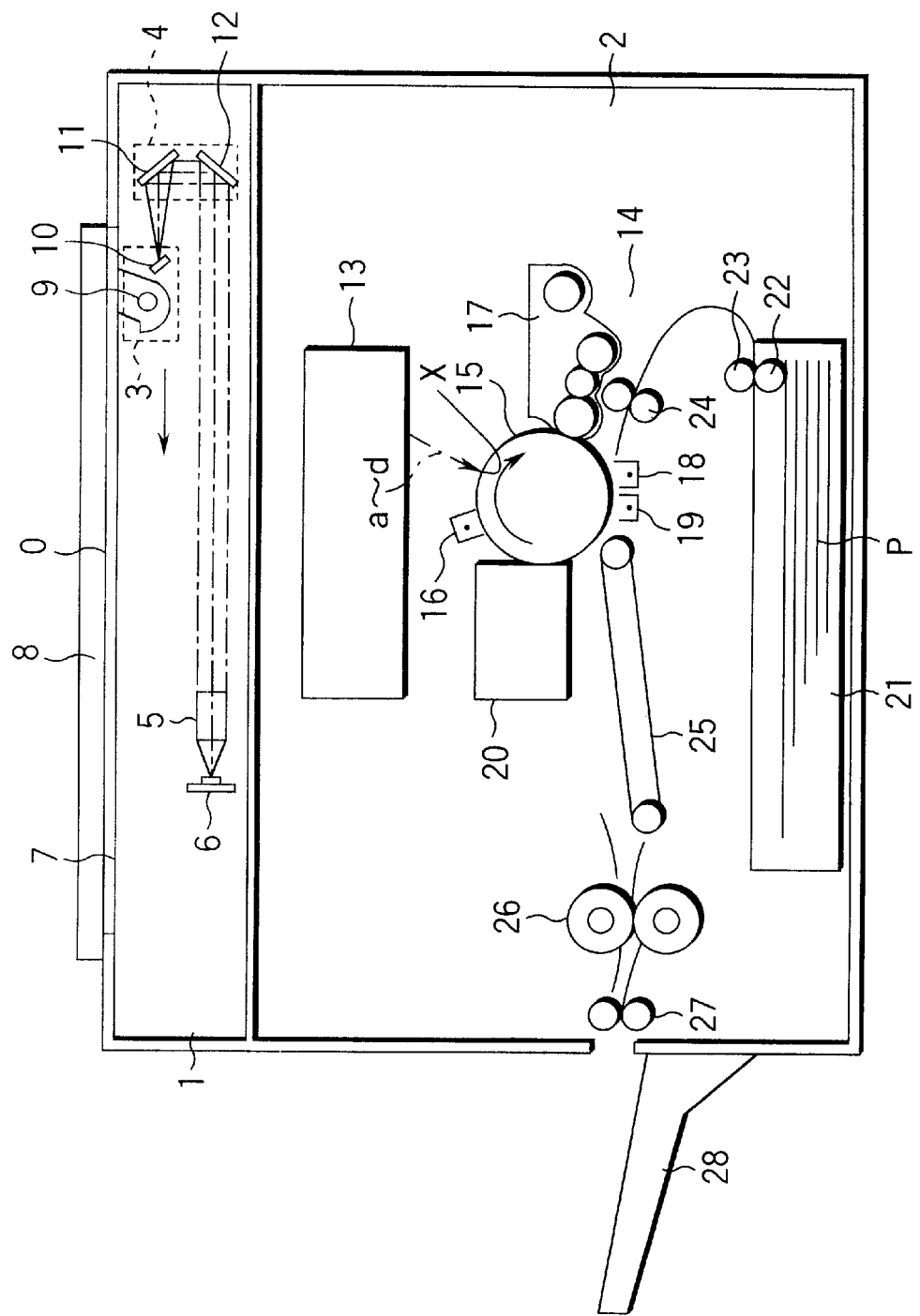
FIG. 1 is a schematic illustration of a digital copying apparatus to which the invention is applied.

Referring now to FIG. 1, there is illustrated schematically the arrangement of a digital copying apparatus as an image formation apparatus to which the present invention is applied. This copying apparatus comprises a scanner 1 as image reading means and a printer 2 as image formation means. The scanner 1 is composed of first and second carriages 3 and 4, which are movable in the direction of an arrow, an imaging lens 5, and a photoelectric conversion element 6.

In FIG. 1, an original document O is placed on a glass plate 7 with its image side down and pressed against the glass plate by a document fixing cover 8.

The document O is illuminated by a light source 9 and reflected light is focused through mirrors 10, 11 and 12 and the imaging lens 5 onto the receiving surface of the photoelectric conversion element 6. The first carriage 3 having the light source 9 and the mirror 10 mounted on it and the second carriage 4 having the mirrors 11 and 12 mounted on it are moved at their respective speeds the ratio of which is 2:1 so that the optical path length is kept constant at all times. The first and second carriages 3 and 4 are moved by a carriage driving motor (not shown) from right to left in synchronization with a read timing signal.

In this manner, the image of the document O placed on the glass plate 7 is read on a line-by-line basis by the scanner 1. The read output is converted by an image processing unit not shown into an 8-bit digital image signal representing the black and white shades of the original image.

The printer 2 is composed of an optical system unit 13 and an image formation unit 14 that is capable of forming an image on paper P as an image forming medium through electrophotography. That is, an image signal read by the scanner 1 from the document O is processed by the image processing unit not shown and then converted into a laser beam (hereinafter referred simply to as a beam) from a semiconductor laser source. With the image formation apparatus of the invention, use is made of a multi-beam optical system using multiple laser sources (e.g., four).

The multiple semiconductor laser sources in the optical system unit 13 are driven by laser modulating signals output from the image processing unit not shown to emit multiple beams. These beams are reflected by a polygon mirror and then output to the outside of the optical system as scanning beams. The detail of the optical system unit 13 will be described later.

The multiple beams from the optical system unit 13 are focused as spots having a required resolution onto exposure position X on a photosensitive drum 15 as an image bearing body, thereby scanning across the drum in the main scanning direction (the direction of axis of rotation of the drum). Further, by the rotation of the drum, a latent image corresponding to the image of the document is formed on the drum.

Around the photosensitive drum 15 are placed an electrification charger 16 for electrifying the drum surface, a development unit 17, a transfer charger 18, a separation charger 19, and a cleaner 20. The photosensitive drum 15 is rotated at a given circumferential speed by a motor not shown and electrified by the electrification charger 16 placed opposite the drum surface. Multiple beams are spot focused onto exposure area X on the electrified photosensitive drum 15 in lines in the sub-scanning direction (the direction of movement of the drum surface).

The electrostatic latent image formed on the photosensitive drum 15 is developed as toner image by a toner (developer) supplied from the development unit 17. The resulting toner image is transferred by the transfer charger 18 onto a sheet of paper that is fed in a timely manner by the paper feed system.

The paper feed system feeds sheets of paper P stored in a cassette 21 placed at the apparatus bottom one at a time with the aid of a feed roller 22 and a separation roller 23. The sheet of paper is then carried through regist rollers 24 to the transfer position in a timely manner. On the downstream side of the transfer charger 18 are placed a paper carry mechanism 25, a fixation unit 26 and eject rollers 27 for ejecting paper having the document image copied on it. Thereby, a sheet of paper having the toner image transferred on it is subjected to tonor image fixation process by the fixation unit 26 and then ejected through the eject rollers 27 to a receiving tray 28.

After the termination of image transfer onto paper, the photosensitive drum 15 has residual toner on it removed by the cleaner 20 and returns to its initial state to wait for the next image formation.

As described above, the document O placed on the glass plate 7 is read by the scanner 1, and the read information is subjected to a series of processes in the printer 2 and then recorded as a tonor image on a sheet of paper P.

The optical system unit 13 will be described next.

Figure 2:
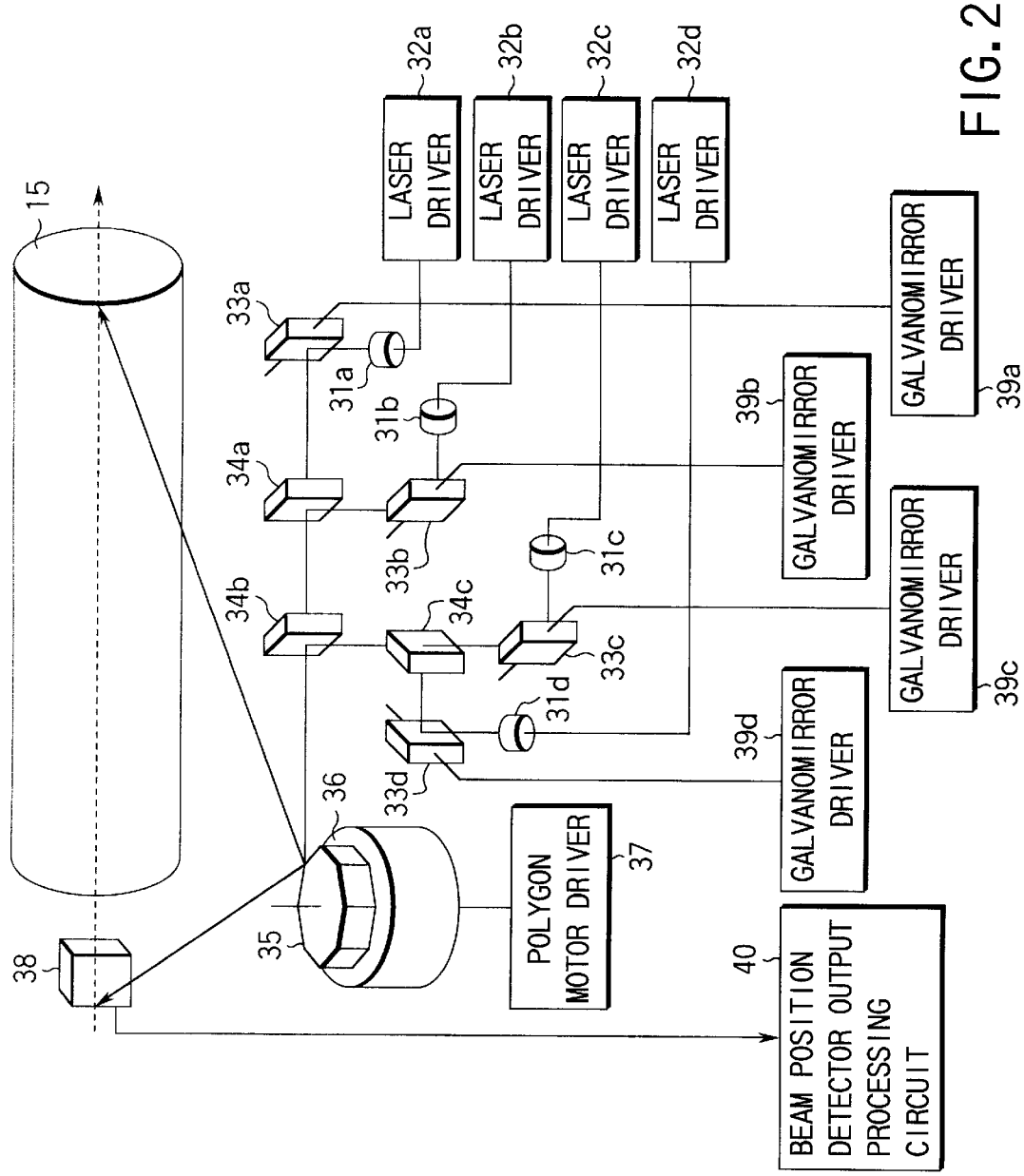
FIG. 2 illustrates the arrangement of the optical system and the photosensitive drum.

FIG. 2 shows the arrangement of the optical system unit 13 and its position relationship with the photosensitive drum 15. The optical system unit 13 has four built-in semiconductor laser sources 31a, 31b, 31c and 31d as beam producing means. Each laser source simultaneously performs image formation on a line-by-line basis, which permits fast image formation without increasing the number of rotations of a polygon mirror extremely.

That is, the laser source 31a is driven by a laser driver 32a and the output beam is directed through a collimator lens not shown and half mirrors 34a and 34b onto the polygon mirror 35 as a polyhedral rotating mirror.

The polygon mirror 35 is rotated at a fixed speed by a polygon motor 36 driven by a polygon motor driver 37. Thereby, reflected light from the polygon mirror 35 scans across the photosensitive drum in a fixed direction at an angular velocity depending on the number of rotations of the polygon motor 36. The beam scanned by the polygon mirror 35 passes through an f-θ lens and then scans across the receiving surface of a beam detector 38 and the photosensitive drum 15 at a constant speed owing to the f-θ characteristic of that lens. The beam detector serves as means for detecting the beam position, the beam transit time, and the beam power.

The laser source 31b is driven by a laser driver 32b and the output beam passes through a collimator lens not shown and is then reflected first by a galvanomirror 33b and then by the half mirror 34a. The reflected light from the half mirror 34a passes through the half mirror 34b and then falls on the polygon mirror 35. After that, the beam from the laser source 31b, as is the case with the beam from the laser source 32a described above, passes through the f-θ lens and then scans across the beam detector 38 and the photosensitive drum 15 at the constant speed.

The laser source 31c is driven by a laser driver 32c and the output beam passes through a collimator lens not shown, then is reflected by a galvanomirror 33c, passes through a half mirror 34C and is reflected by the half mirror 34b onto the polygon mirror 35. After that, the beam from the laser source 31c, as is the case with the beams from the laser sources 32a and 32b described above, passes through the f-θ lens and then scans across the beam detector 38 and the photosensitive drum 15 at the constant speed.

The laser source 31d is driven by a laser driver 32d and the output beam passes through a collimator lens not shown, and then is reflected first by a galvanomirror 33d, next by the half mirror 34C and finally by the half mirror 34b onto the polygon mirror 35. After that, the beam from the laser source 31d, as is the case with the beams from the laser sources 32a, 32b and 32c described above, passes through the f-θ lens and then scans across the beam detector 38 and the photosensitive drum 15 at the constant speed.

In this manner, the four beams from the laser sources 31a to 31d are combined to travel toward the polygon mirror 35 through the half mirrors 34a, 34b and 34c.

Therefore, the four beams are allowed to scan across the photosensitive drum 15 at the same time, which allows an image to be recorded four times faster than with the conventional scanning of a single beam, provided that the number of rotations of the polygon mirror 35 remains unchanged.

Each of the galvanomirrors 33a, 33b, 33c and 33d is driven by a corresponding one of drivers 39a, 39b, 39c and 39d to adjust the position of the corresponding beam in the sub-scanning direction.

The beam detector 38 detects the transit positions, the transit times and the powers (i.e., light intensities) of the four beams. The beam detector is placed in the vicinity of one end of the photosensitive drum 15 and its light receiving surface is set at the same level as the drum surface. On the basis of detect signals from the beam detector, the galvanomirrors 33a to 33d are controlled (image formation position control in the sub-scanning direction) and the laser sources 31a to 31d are subjected to control of emission power and emission timing (image formation position control in the main scanning direction). In order to produce signals for these control operations, a beam detector output processing circuit 40 is connected to the beam detector 38.

The control system will be described next.

Figure 3:
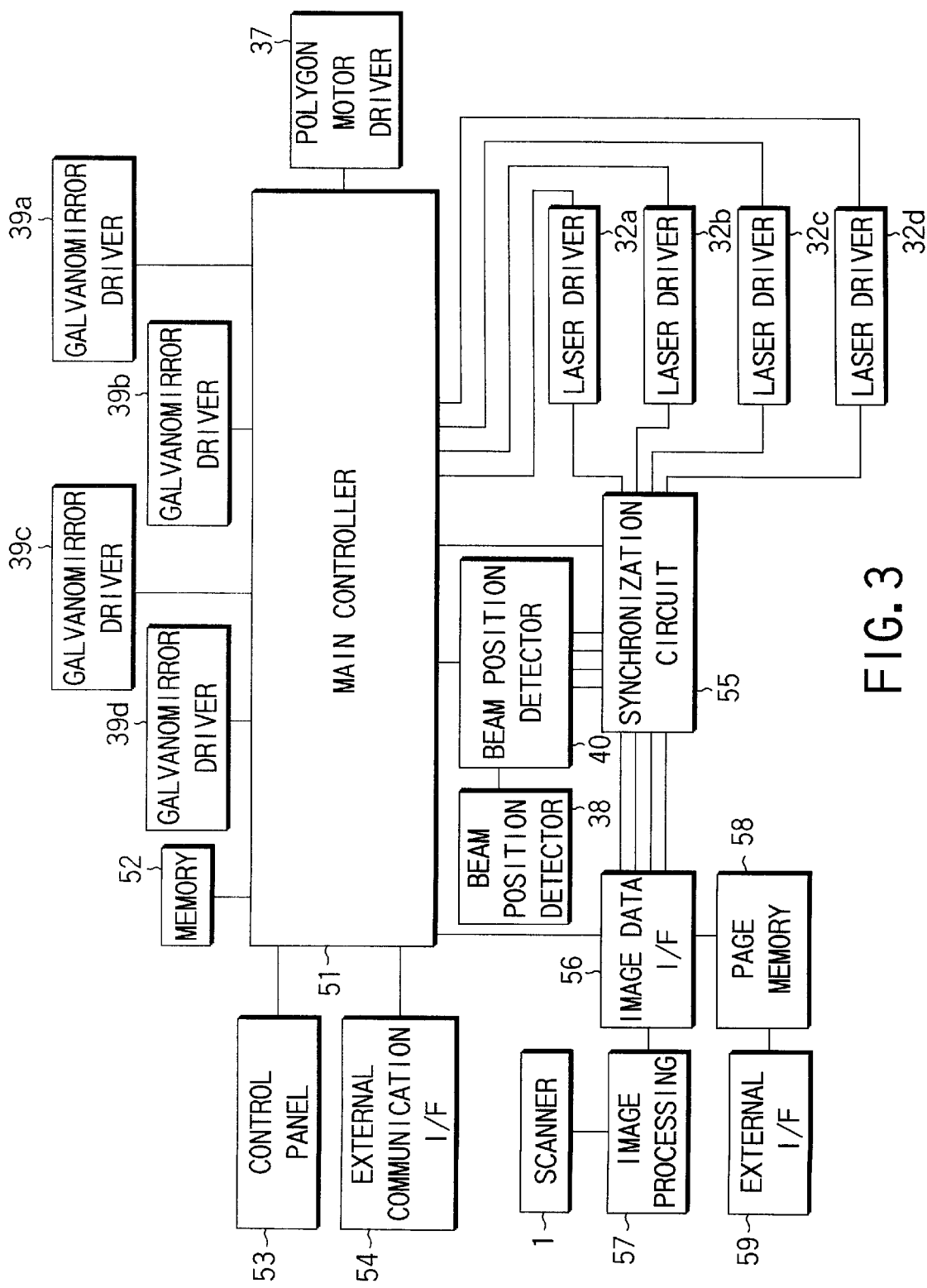
FIG. 3 illustrates the arrangement of the control system mainly for the multi-beam optical system.

FIG. 3 mainly shows the control section for the multi-beam optical system. Reference numeral 51 denotes the main controller for overall control, which comprises a CPU by way of example. To the controller 51 are connected a memory 52, a control panel 53, an external communication interface (I/F) 54, the laser drivers 32a to 32d, the polygon mirror motor driver 37, the galvanomirror drivers 39a to 39d, the beam detector output processing circuit 40, a synchronization circuit 55, and an image data interface 56.

The synchronization circuit 55 is connected to the image data interface 56, to which an image processing unit 57 and a page memory 58 are connected. The scanner 1 is connected with the image processing unit 57. An external interface 59 is connected to the page memory 58.

Here, the flow of image data when an image is formed will be described briefly.

First, in the case of copy operation, as described previously, the image of the document O placed on the glass plate 7 is read by the scanner 1 and the resulting image data is sent to the image processing unit 57 where it is subjected to, for example, shading compensation, various filtering processes, gradation process, and gamma correction.

The image data from the image processing unit 57 is sent to the image data interface 56, which acts to allocate the image data to the four laser drivers 32a to 32d.

The synchronization circuit 55 generates a clock pulse at the time when each beam passes over the beam detector 38 and, in synchronization with the clock pulse, delivers image data from the image data interface 56 to a corresponding one of the laser drivers 32a to 32d as a laser modulating signal.

The synchronization circuit 55 includes sample timers for forcing the laser sources 31a to 31d to emit light in non-image area and controlling the power of each beam and logic circuits for detecting the position in the main scanning direction of each beam when it passes over the beam detector 38.

By transferring image data in synchronization with the scanning of each beam in this way, image formation is performed with synchronization established in the main scanning direction (in the correct position).

The control panel 53 is man-machine interface for starting a copy operation and setting the number of copies, etc.

This digital copying apparatus is also configured such that image data externally input through the external interface 59 connected to the page memory 58 can be adapted for image formation. The image data input from the external interface 56 is stored temporarily in the page memory 58 and then sent to the synchronization circuit 55 through the image data interface 56.

If the digital copying apparatus is controlled from outside through a network by way of example, then the external interface 54 will act as a control panel instead of the control panel 53.

The galvanomirror drivers 39a to 39d drives the galvanomirrors 33a to 33d as instructed by the main controller 51. Thus, the main controller can freely control the angle of each of the galvanomirrors 33a to 33d via a corresponding one of the galvanomirror drivers 39a to 39d.

The polygon motor driver 37 drives the polygon motor 36 for rotating the polygon mirror 35 that scans the aforementioned four beams. The main controller 51 can instruct the polygon motor driver 37 to start and stop the polygon motor and change its number of rotations. In identifying the transit positions of the beams by the beam detector 38, the polygon motor 36 is rotated at a lower speed than at the image formation time.

The laser drivers 32a to 32d have a function of driving the laser sources 31a to 31d into forced emission by a forced emission signal from the main controller independently of image data as well as a function of driving the laser sources according to image data as described previously.

The main controller 51 sets the power of beams emitted by the laser sources 31a to 31d through the laser drivers 32a to 32d. The emission power settings are changed according to variations in process conditions and detected transit positions of beams.

The memory 52 is used to store information required for control. For example, the memory stores controlled variables of the galvanomirrors 33a to 33d, circuit characteristics for detecting the transit positions of beams (offset values of amplifiers) and the order in which the beams arrive, thereby allowing the optical system unit 13 to be in imaging condition immediately after power-on.

Figure 4:
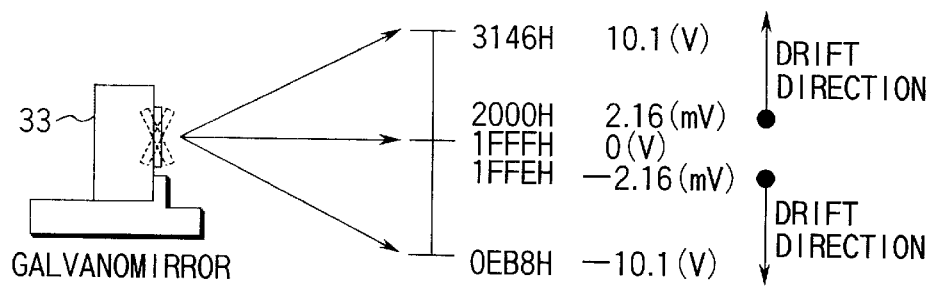
FIG. 4 illustrates the direction of drift of a galvanomirror.

Next, the prediction of the drift direction of the galvanomirror 33 of the present invention will be described. FIG. 4 shows the drift phenomenon of the galvanomirror.

The galvanomirrors exhibit a drift phenomenon due to ambient temperature as described in Japanese Unexamined Patent Application No. 2000-147398. The amount of drift varies from galvanomirror to galvanomirror. Thus, a change in the beam position due to the drift phenomenon is corrected using the sub-scanning control.

When the galvanomirror is sufficiently energized, the image plane position of the beam reflected by the galvanomirror varies from at the start of energization even if the directive value remains unchanged. After the position correction, the galvanomirror is deenergized and then cooled. Even if the same directive value is given again to the galvanomirror after it has been cooled sufficiently, the image plane position varies. The direction of drift of the galvanomirror depends on the direction of current flow in the coil.

In FIG. 4, with a directive value of 2000H or more (plus voltage side), the galvanomirror drifts to more plus side. With a directive value of 1FFE or less (minus voltage side), the galvanomirror drifts to more minus side. owing to this characteristic it is possible to predict the direction of drift of the galvanomirror from the last control value.

Figure 5:
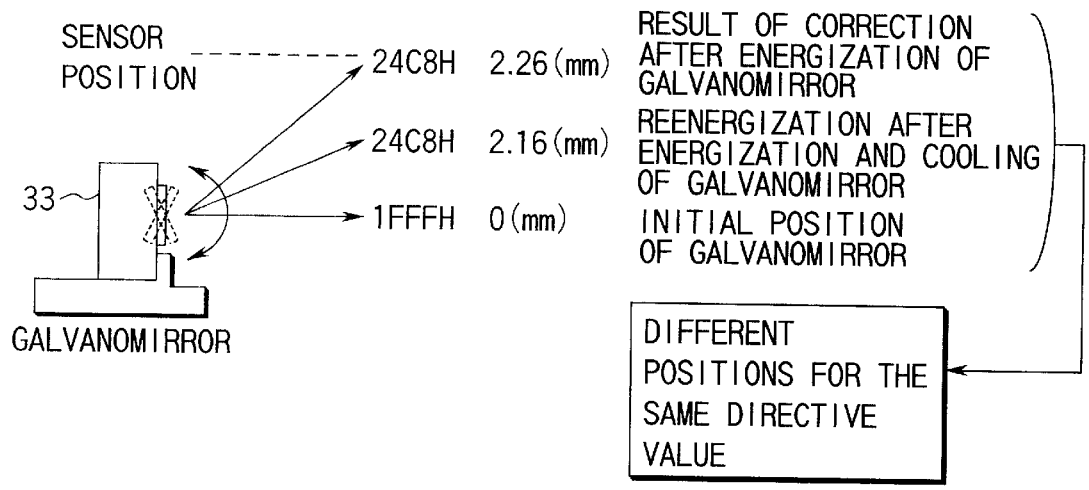
FIG. 5 is a diagram for use in explanation of the drift of the galvanomirror.

FIG. 5 shows the effect of drift of the galvanomirror. In order to position the beam on the sensor by coarse adjustment, the galvanomirror is given a directive value of 2500H for example and then energized for ten minutes. If the drift is then corrected by 100 μm in the minus direction, then the directive value after the ten-minute energization becomes 24C8H. (It is supposed here that a change in the image plane position for one bit in directive value for the galvanomirror is 1.76 μm.) At the start of energization (the directive value is 2500H), the image plane position is in the vicinity of 2.6 mm above the initial position before energization (the directive value is 1FFFH:0 mm).

In order to eliminate the effect of the drift of the galvanomirror, energization is stopped after ten minutes (the directive value is 24C8H and the image plane position is in the vicinity of 2.26 mm) and the directive value of 24C8H is given again to the galvanomirror at the time of energization after it has been cooled. Then, the image plane position is in the neighborhood of 2.16 mm above the initial position (0 mm). That is, the position of the galvanomirror when the power is turned off after it has been sufficiently energized is on the plus side with respect to the position when the power is turned on again after it has been cooled. Thus, if the directive value is changed in small increments from 24C8H to 3146H (upper limiting value), the sensor can be found within several control steps, allowing efficient adjustment. If the directive value at the time of energization is below the initial value (1FFFH), the directive value is simply changed in the direction of the lower limiting value. In this manner, the sensor position is predicted and the galvanomirror is then oriented in the predicted direction.

Figure 6:
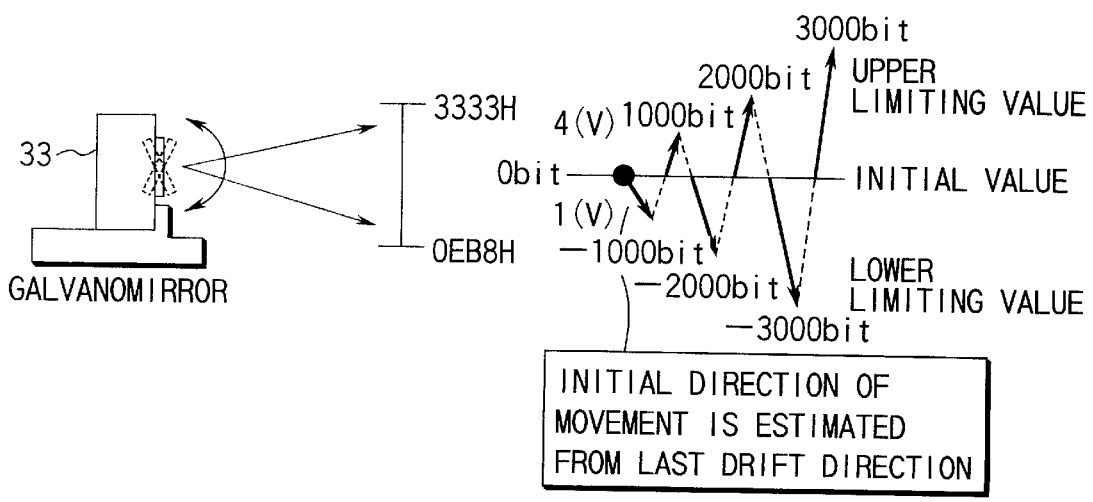
FIG. 6 is a diagram for use in explanation of multi-beam sub-scanning coarse adjustment control of the invention.

FIG. 6 is a diagram for use in explanation of the coarse adjustment in the sub-scanning direction according to the present invention. The final value in the last control corresponding to the target position is given to the galvanomirror (in FIG. 6, this value is indicated as 0 bits for the purpose of simplifying the description; however, in practice, it is 24C8H as in the above example). Movement is made 100 bits by 100 bits from the final value to the predicted direction. When a fixed amount of movement (in FIG. 6, −1000 bits, +1000 bits, −2000 bits, ...)is reached, a return is made to the last value (in FIG. 6, 0 bits) prior to movement to search for the sensor in the opposite direction. This is because there is the possibility that the predicted direction may prove wrong due to external factors of temperature, distortion of the optical unit due to vibration, etc. If, when the predicted direction proved wrong, control is performed in one direction until the maximum directive value (e.g., 0EB8H) is reached and then in the opposite direction, the load on the galvanomirror will increase. To avoid this, the scanning direction is changed each time a fixed amount of movement is reached.

When there is no response from the sensor even if the movement has been made by the fixed amount in the opposite direction, a return is made again to the last value prior to the movement and the movement is started again in the predicted direction with increased amount of movement. The above operation is repeated until the sensor makes a response or the directive value reaches the upper limiting value (3146H) or the lower limiting value (0EB8H).

Figure 7:
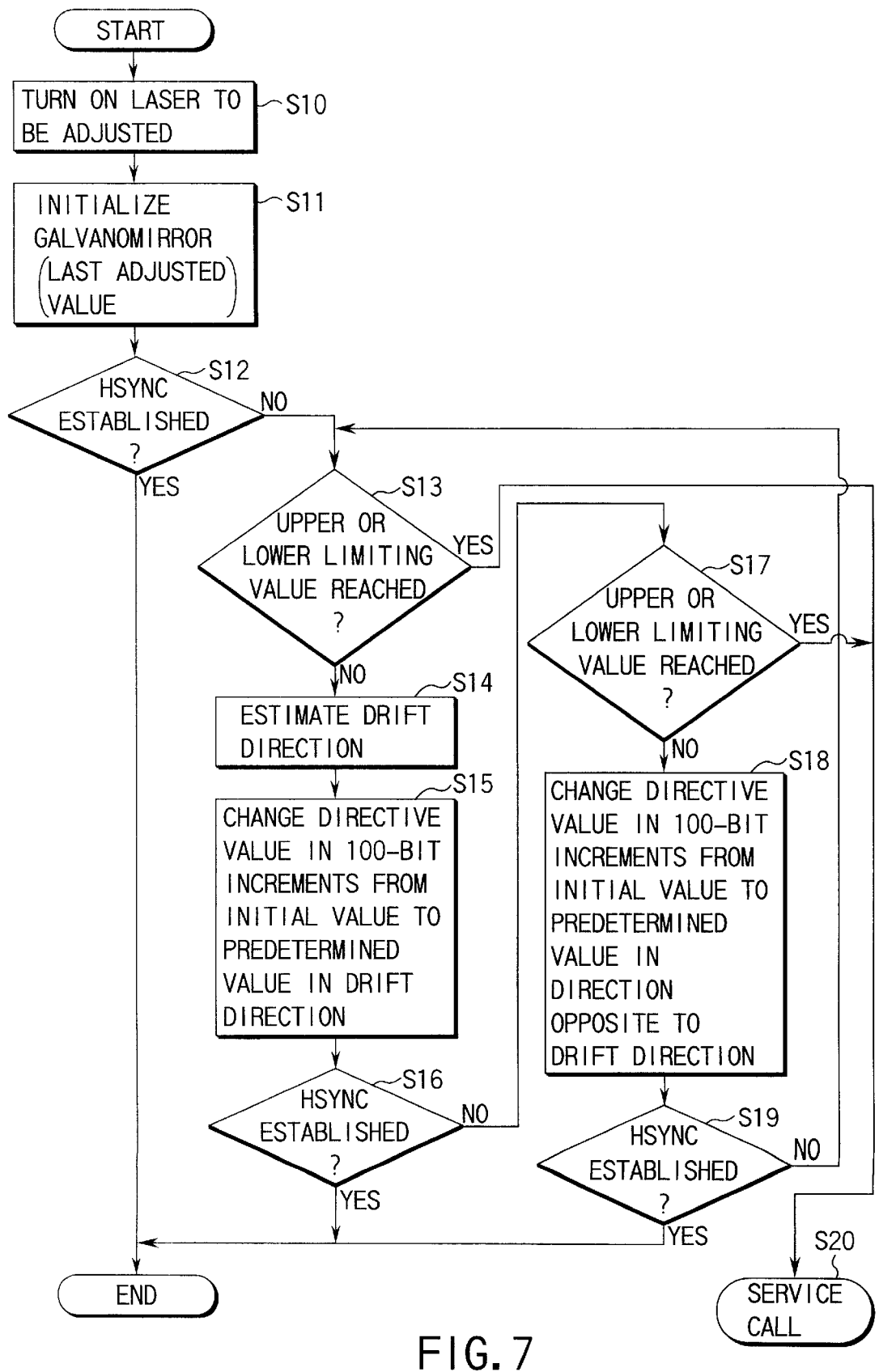
FIG. 7 is a flowchart for the multi-beam sub-scanning coarse adjustment control of the invention.

FIG. 7 is a flowchart for the above control operation. First, in step S10, only a beam to be adjusted, of the four beams, is turned on. Then, an initial value (last controlled variable) is given to the corresponding galvanomirror (step S11). A determination is made as to whether HSYNC generated by the sensor receiving the laser beam is established (step S12). If the HSYNC is established, then the coarse adjustment is terminated at that time and fine adjustment may be made.

When HSYNC is not detected, a determination is made in step S13 as to whether the directive value has reached the upper or lower limiting value. If not, the drift direction is predicted as described in connection with FIG. 6 (step S14). The directive value to the galvanomirror is changed in 100-bit increments from the initial value in the predicted direction (step S15). This increment is repeated until HSYNC is established (step S16) or the directive value reaches a fixed value (−1000 bits in the example of FIG. 6).

When HSYNC is not established (step S16), the determination is made in step S17 as to whether the directive value has reached the upper or lower limiting value. If not, the directive value is changed from the initial value in 100-bit increments in the direction opposite to the predicted drift direction (step S18). This increment is repeated until HSYNC is established (step S19) or the directive value reaches a fixed value (+1000 bits in the example of FIG. 6).

When the directive value has reached the upper or lower limiting value (step S17), a service call is set with appropriate display on the apparatus body (step S20).

The above control is repeated until HSYNC has been established for all the beams. The control is repeated in the order of, for example, beam 1, beam 2, beam 3, beam 4, beam 1 and so on. If there are beams for which adjustment has been made, they are skipped and the control is repeated in the order of, for example, beam 1, beam 3, beam 4, beam 1 and so on.

The above control allows the load on the galvanomirrors to be reduced and the time taken by the coarse adjustment to be reduced.

Next, the measurement of the individual characteristics of galvanomirrors will be described. In this embodiment, when the power is turned on for the first time in a multi-beam copying apparatus equipped with galvanomirrors to control the beam position, a change in the image plane position and the response time for a directive value to each galvanomirror are measured and the measurements are stored. Using the measurements, the directive value and the data sampling time are optimized according to the individual characteristics of each galvanomirror, allowing the control time to be reduced and the total control time to be estimated, thereby increasing the overall efficiency of the beam control.

Figure 8:
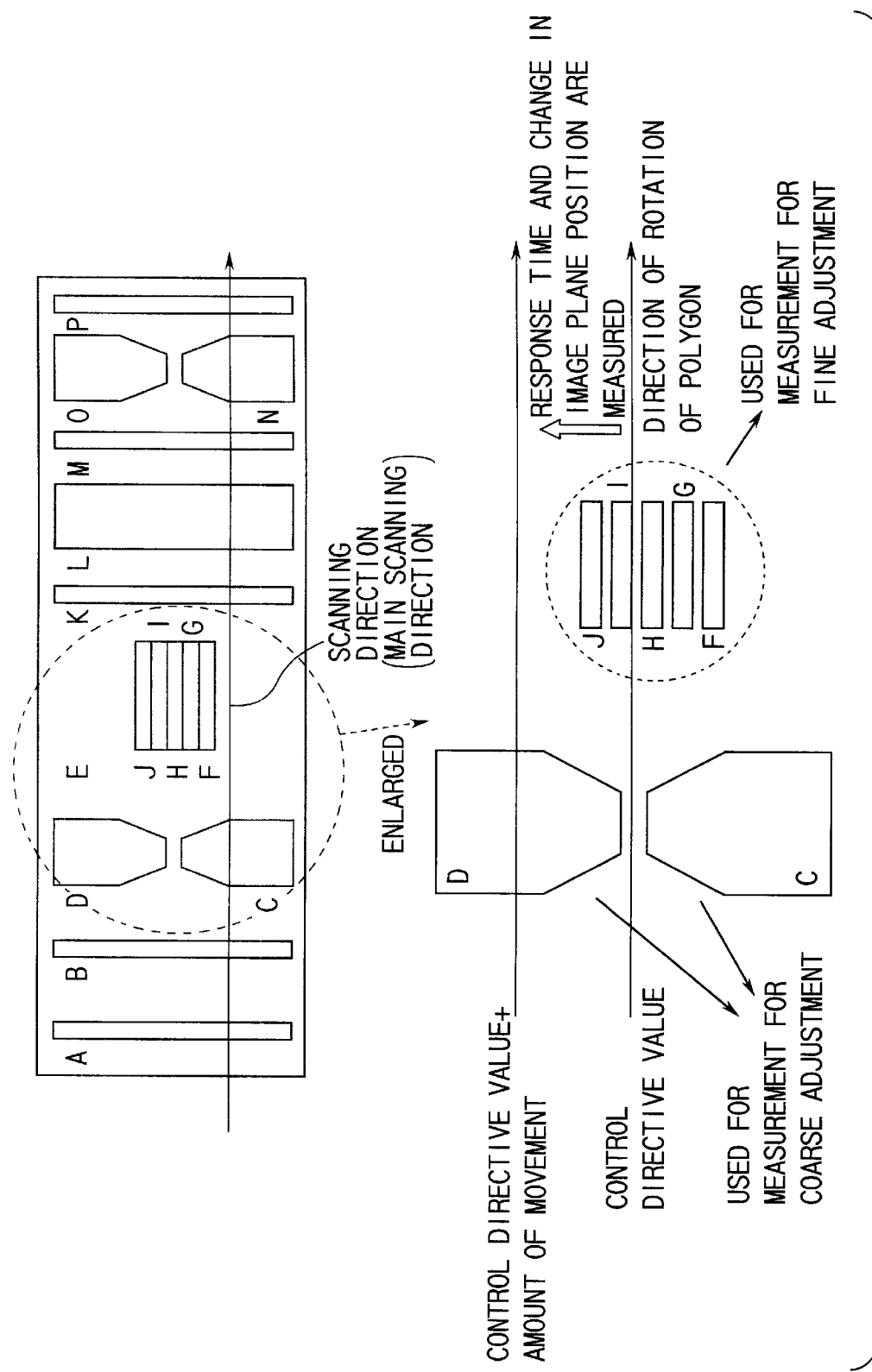
FIG. 8 is a schematic diagram of a position sensor used in the invention and an enlarged view of it.

FIG. 8 shows the schematic of the sensor 28 used for beam control together with its enlarged view. In FIG. 8, the sensor used for beam sub-scanning position control comprises sensors C and D of angle sensors C, D, N and O and position sensors F to J formed in the shape of stripes as described in Japanese Unexamined Patent Application No. 2000-147398.

Each of these sensors outputs a current of different magnitude according to the beam position when a beam is present in the detect area. Using the current outputs, a change in the image plane position for one bit in the directive value for a galvanomirror and the response time for the directive value are measured.

Figure 9:
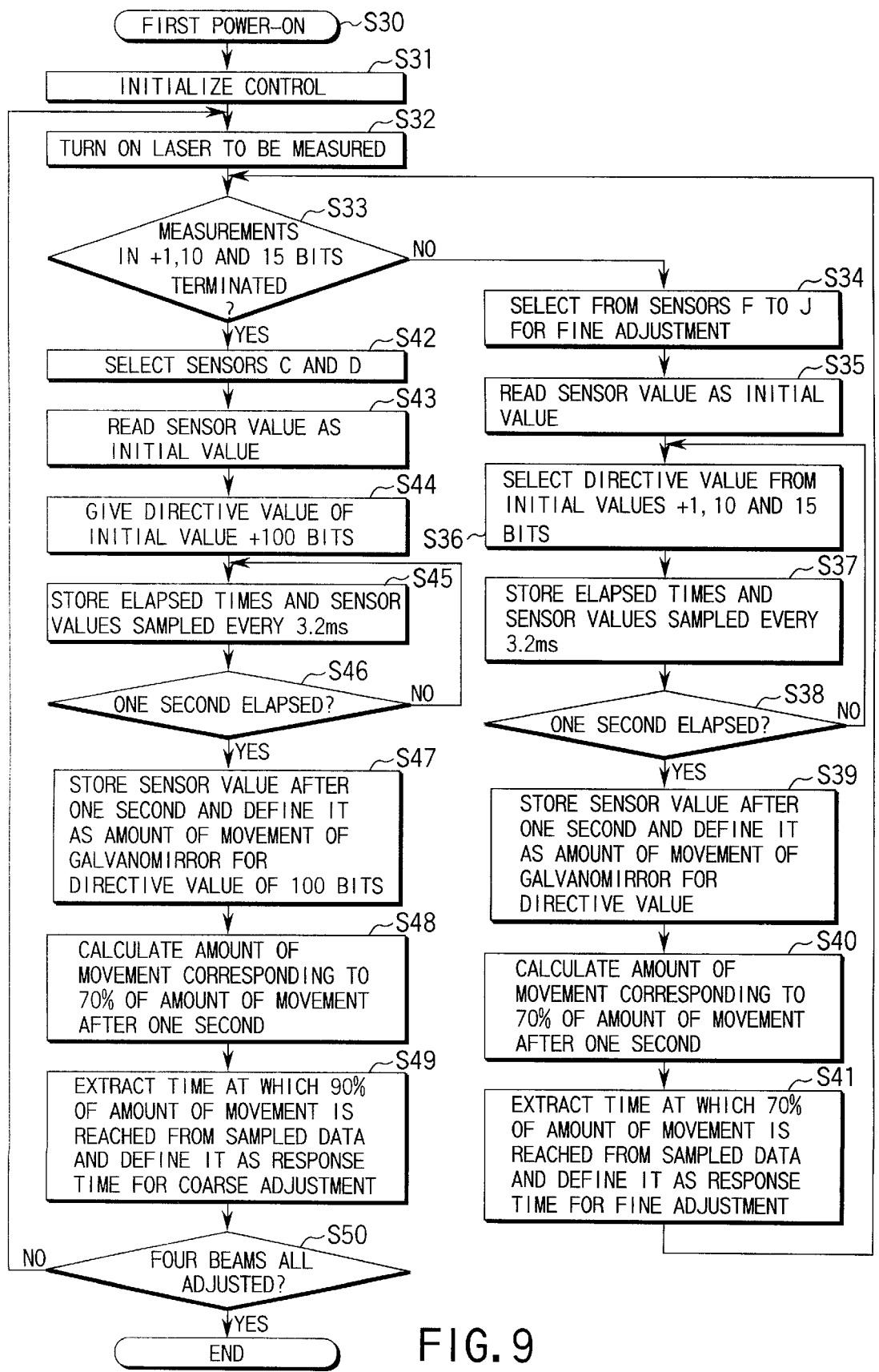
FIG. 9 is a flowchart illustrating a first galvanomirror individual characteristic measurement method.
Figure 10:
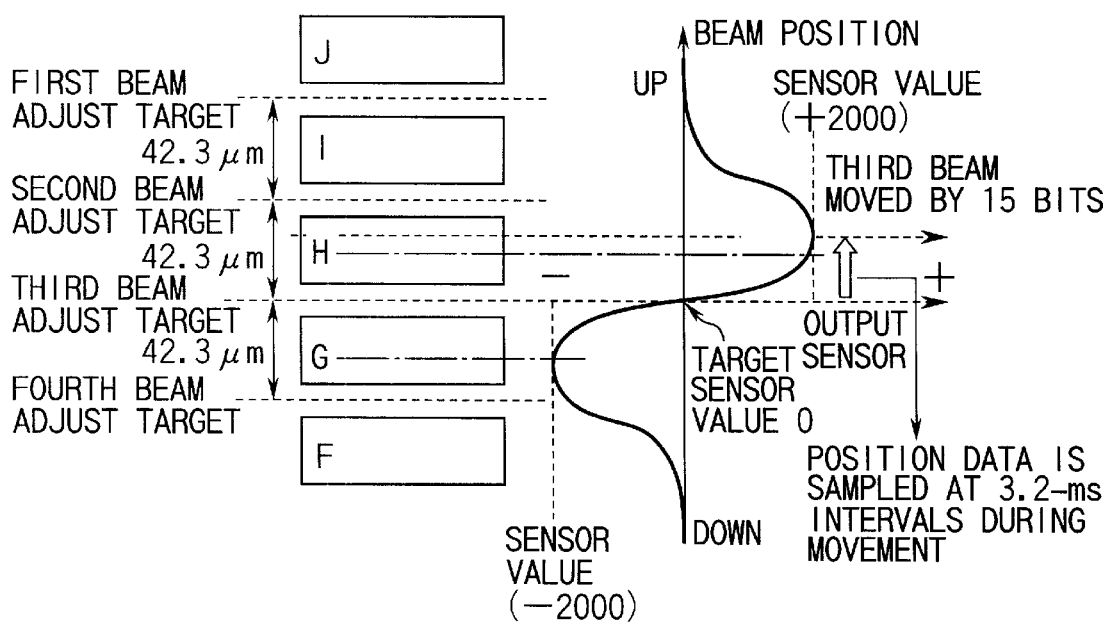
FIG. 10 is a diagram for use in explanation of the first galvanomirror individual characteristic measurement method used in fine adjustment.
Figure 11:
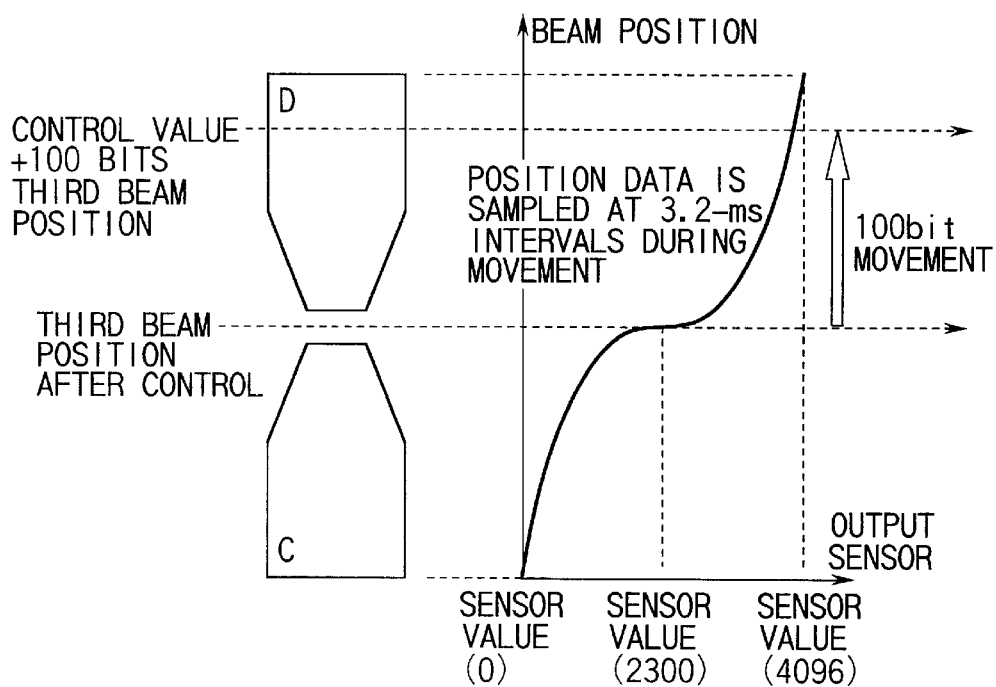
FIG. 11 is a diagram for use in explanation of a second galvanomirror individual characteristic measurement method used in coarse adjustment.

First, a first measurement method will be described. FIG. 9 is a flowchart for the first galvanomirror characteristic measurement method, FIG. 10 is a diagram for use in explanation of individual characteristic measurement for galvanomirror fine adjustment by the first measurement method, and FIG. 11 is a diagram for use in explanation of individual characteristic measurement for galvanomirror coarse adjustment by the first measurement method.

First, when the power is turned on in a digital copying apparatus equipped with galvanomirrors, the conventional beam position control is performed (step S31). That is, as shown in FIG. 10, the first beam is controlled to scan across the line midway between the sensors J and I. Likewise, the second beam is controlled to scan across the line midway between the sensors I and H. The third beam is controlled to scan across the line midway between the sensors H and G, and the fourth beam is controlled to scan across the line midway between the sensors G and F.

After the sub-scanning position control of each beam, the resultant control directive value is changed stepwise. Changes in the beam image plane position for changes in the directive value and the beam response times are measured as values used in sub-scanning fine adjustment. For example, as shown in FIG. 9, one directive value selected from the last control value +1 bit (about 2 $\mu$m), 10 bits (about 18 $\mu$m) and 15 bits (about 27 $\mu$m) is given to the galvanomirror (step S36) and the time that elapsed since the directive value was given and the sensor value are stored in a set (step S37). FIG. 10 shows the manner in which the sensor value varies when a directive value of 15 bits was given to the galvanomirror for the third beam. It is noted that the directive value of one bit is the minimum of the directive value. Therefore, the directive value of 15 bits is a value 15 times larger than the minimum(one bit) of the directive value.

The measurements of the time and the sensor value are made for each of eight surfaces (403 $\mu$S for one surface) of the polygon mirror. The measurements are averaged and the average value is handled as an item of data. That is, the average value is calculated at 3.2-mS (403 $\mu$S×8) intervals. Supposing the sensor value after one second to be the final value for the change in the image plane position for the directive value, data sampling is performed for one second (step S39). A day unit of time will be taken until the drift of the galvanomirror becomes saturated. Thus, it takes long to take the completely saturated value as the final value, which is very unfavorable for control. Here, the sensor value after one second which corresponds to 95% of the image plane position at the saturation time is handled as the final value. Such measurements are made for directive values of the initial value +1 bit, 10 bits, and 15 bits.

Upon termination of measurements of the response time for the initial values +1 bit, 10 bits and 15 bits (Yes in step S33), a directive value of initial value +100 bits is given as a change in the image plane position used in sub-scanning coarse adjustment (step S44). The response for the directive value is also measured (step S45). For measurement when the directive value is 100 bits, the angled sensors C and D are used as shown in FIG. 10.

The above measurements are made for each of the multiple beams. The reason why many directive values, such as 1 bit, 10 bits, 15 bits, and 100 bits, are used is that the magnitude of error varies according to the distance moved (the greater the distance moved, the greater the error). Selecting data close to the target distance moved during the beam position control from acquired data allows control with little error.

Figure 12:
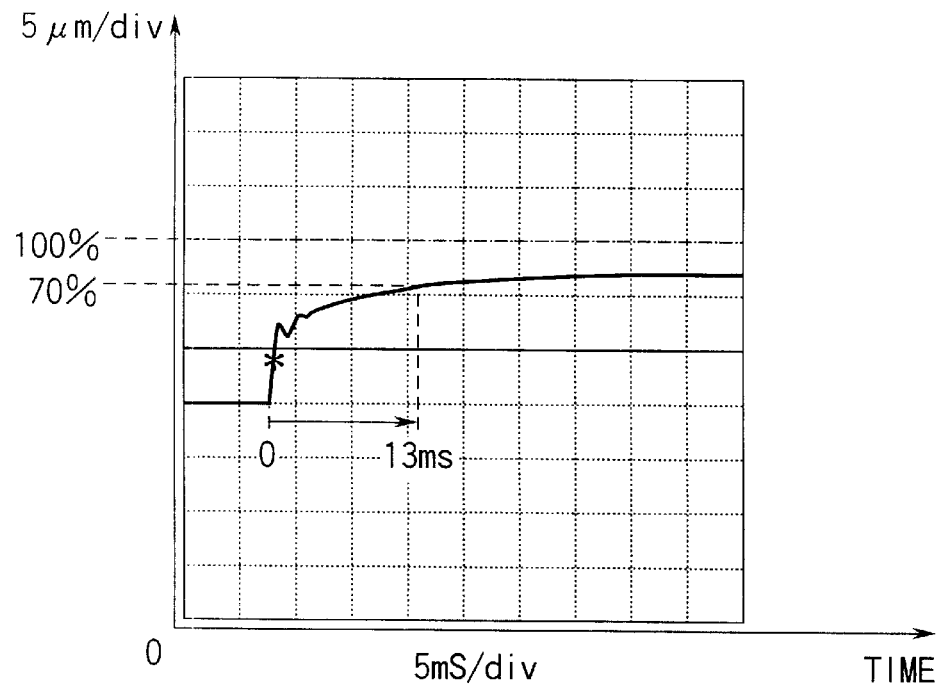
FIG. 12 is a diagram for use in explanation of the sampling time in fine adjustment.

Hereinafter, a description is given of a method for extracting information required for beam position control from sampled data. FIG. 12 is a diagram for use in explanation of the sampling time for fine adjustment, and FIG. 13 is a diagram for use in explanation of the sampling time for coarse adjustment.

Figure 13:
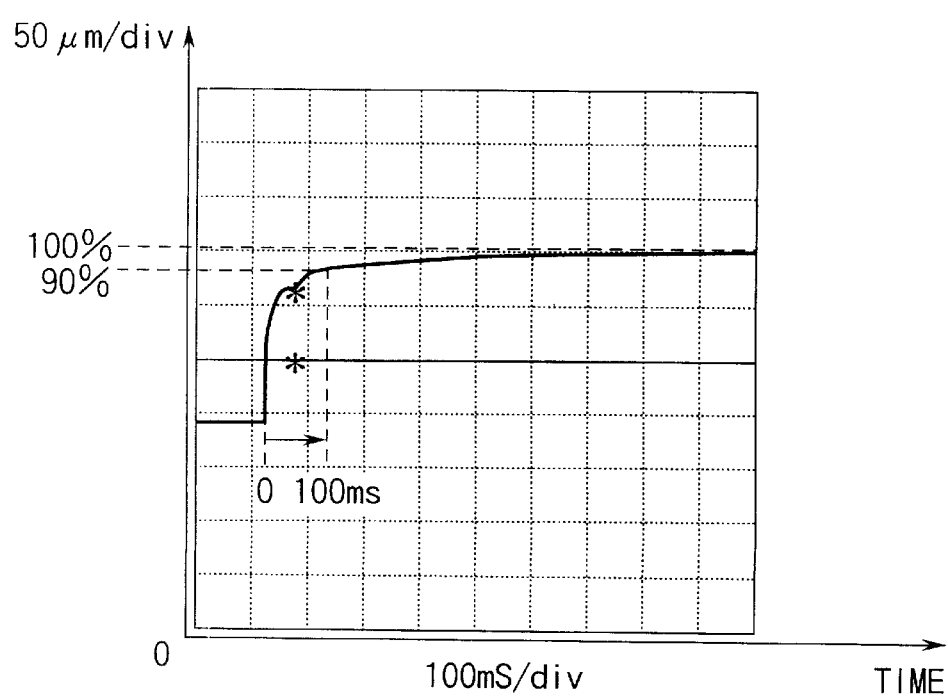
FIG. 13 is a diagram for use in explanation of the sampling time in coarse adjustment.

In the beam sub-scanning position control, the sampling times for the fine adjustment and the coarse adjustment are about 13 mS and about 100 mS, respectively, as shown in FIGS. 12 and 13. The sensor values read in at these sampling times correspond generally to 70% and 90% of the final value. Since it is very unfavorable in control efficiency to wait for the galvanomirror drift to become saturated, the sensor values at stages of 70% and 90% are read and used for beam position control. In the fine adjustment in which the movement of the galvanomirror is small, since the error is small, the 70% value is used. On the other hand, in the coarse adjustment in which the movement of the galvanomirror is great, the 90% value is used since the error is great.

In the present invention, the time at which 70 or 90% of the distance moved by the beam after one second is reached is calculated for each of the multiple beams and the results are used for the fine and coarse adjustment.

That is, as indicated in step S40 of FIG. 9, the distance moved which is 70% of the distance moved after one second is calculated for each beam. For example, supposing the distance moved by the beam one second after a directive value of 15 bits was given to be 30 $\mu$m, the 70% value is 21 $\mu$m. Like calculations are made for directive values of 10 bits and 1 bit. Next, the time required to reach the 70% distance is extracted from the sampled data stored in step S37. The time is used as the response time in the sub-scanning fine adjustment.

As indicated in step S48 of FIG. 9, in the coarse adjustment as well, the distance moved which is 90% of the distance moved after one second is calculated for each beam. For example, supposing the distance moved by the beam one second after a directive value of 100 bits was given to be 200 $\mu$m, the 90% value is 180 $\mu$m. Next, the time required to reach the 70% distance is extracted from the sampled data stored in step S45 (step S48). The time is used as the response time in the sub-scanning coarse adjustment.

Figure 14:
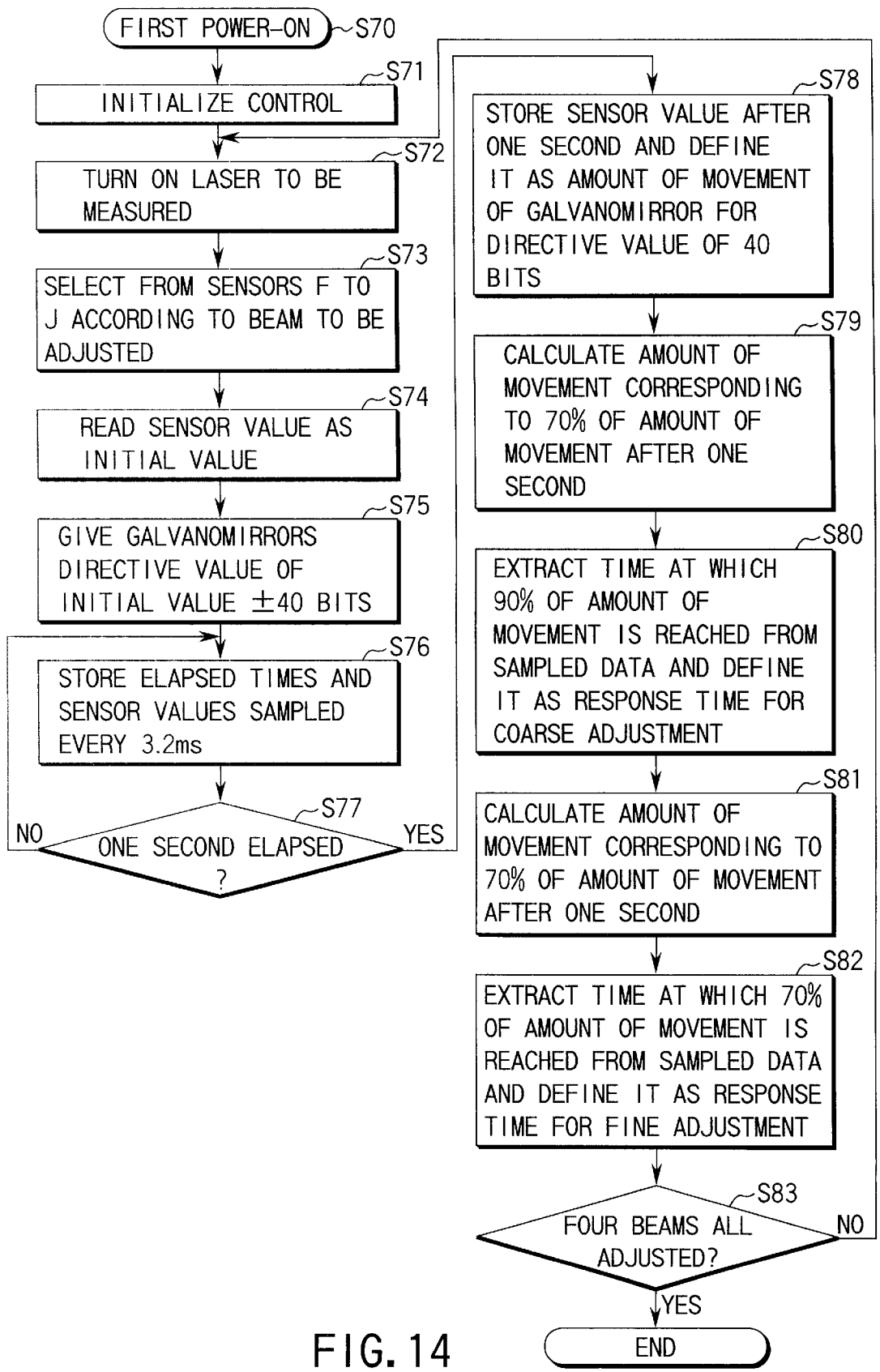
FIG. 14 is a flowchart illustrating a second galvanomirror individual characteristic measurement method.

Next, a second measurement method will be described. FIG. 14 is a flowchart for the second galvanomirror individual characteristic measurement method, and FIG. 15 is a diagram for use in explanation of the second measurement method.

As indicated in steps S70 and S71 of FIG. 14, when the power is turned on in a digital copying apparatus equipped with galvanomirrors, the conventional beam position control is performed as in the first measurement method.

After beam sub-scanning control, a change is made to the directive value given to the galvanomirror. using the stripe-shaped position sensors F to J, a change in the beam image plane position for the change in the directive value and the beam response time are measured.

Figure 15:
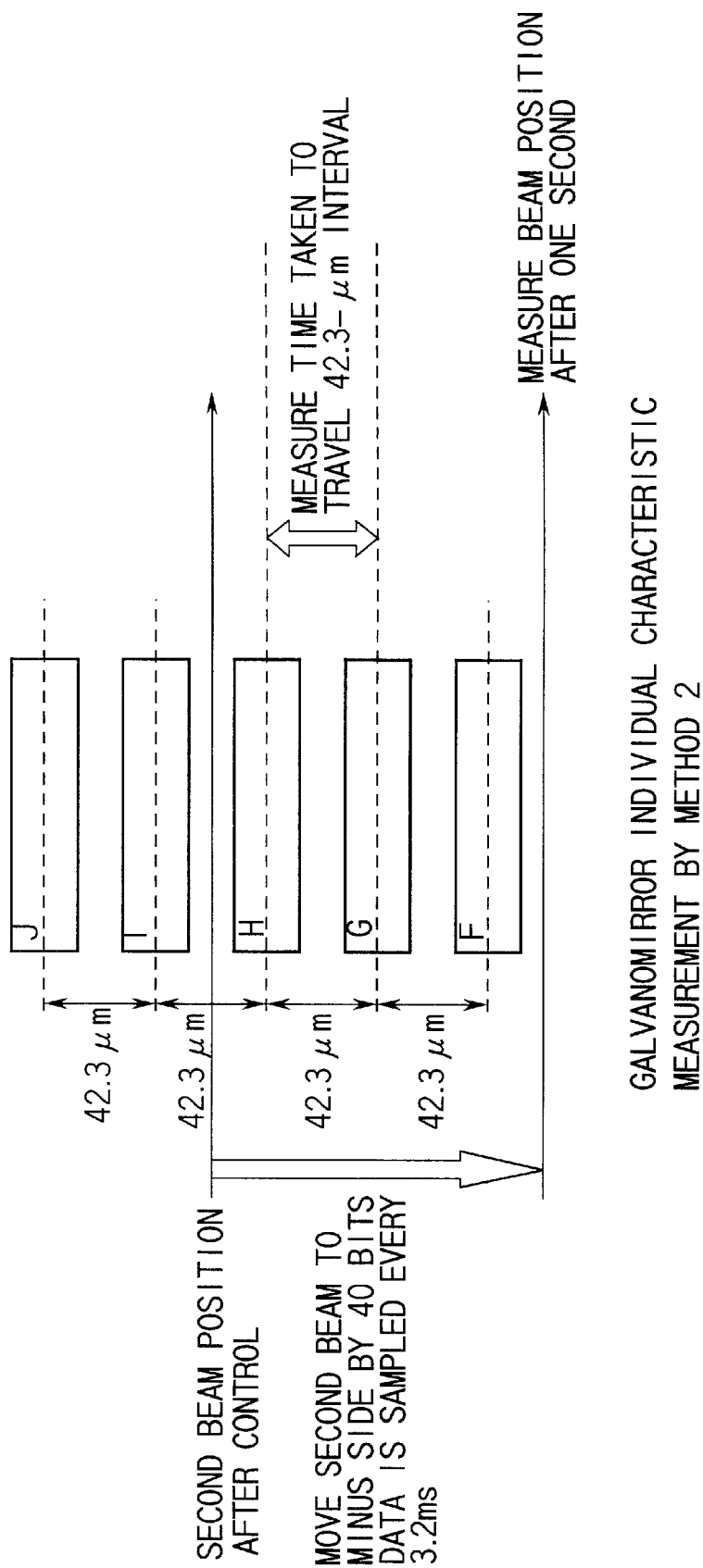
FIG. 15 is a diagram for use in explanation of the second galvanomirror individual characteristic measurement.

As shown in FIG. 15, the sensors F to J are arranged with a center-to-center spacing of 42.3 $\mu$m. In step S75, a directive value which is an initial value plus or minus 40 bits is given to each galvanomirror. Specifically, the galvanomirrors for the first and second beams are given values 40 bits less than initial values respectively, and the galvanomirrors for the third and fourth beams are given values 40 bits more than initial values respectively.

For example, in moving the second beam, which has been subjected to fine adjustment, by 40 bits in the minus direction for the second measurement method, the sensor value is sampled at 3.2-mS intervals as in the first measurement method. Supposing the second beam to be moved by 80 $\mu$m after one second, a change in the image plane position for the directive value 40 bits is 80 $\mu$m (step S78). Thus, a change in the image plane position for the directive value 100 bits is 200 $\mu$m, which is used for coarse adjustment. A change in the image plane position for the directive value 15 bits is 30 $\mu$m, and a change in the image plane position for the directive value 10 bits is 20 $\mu$m. A change in the image plane position for the directive value 1 bit is 2 μm. These values are used for fine adjustment.

The peak outputs of the sensors H and G are detected. The time interval between the peak outputs is detected and stored. For example, suppose that 25.6 mS is taken for movement between the sensors H and G. This means that 25.6 mS is taken to move 42.3 μm, or the center-to-center spacing of the sensors H and G. Thus, 121 mS is taken to move 200 μm, or the change in the image plane position for the directive value 100 bits and 109 mS is taken to move 180 μm, or 90% of the change in the image plane position for the directive value 100 bits. This data is stored as the response times of the galvanomirror and used for coarse adjustment. Also, 18.2 mS is taken to move 30 μm, or the change in the image plane position for the directive value 15 bits and 12.7 mS is taken to move 21 μm, or 70% of the change in the image plane position for the directive value 15 bits. This is stored as the response time of the galvanomirror and used for fine adjustment. Likewise, calculations are made for the directive values 10 bits and 1 bit. The time taken to move 70% of the change in the image plane position for each directive value is stored and used for fine adjustment.

Figure 16:
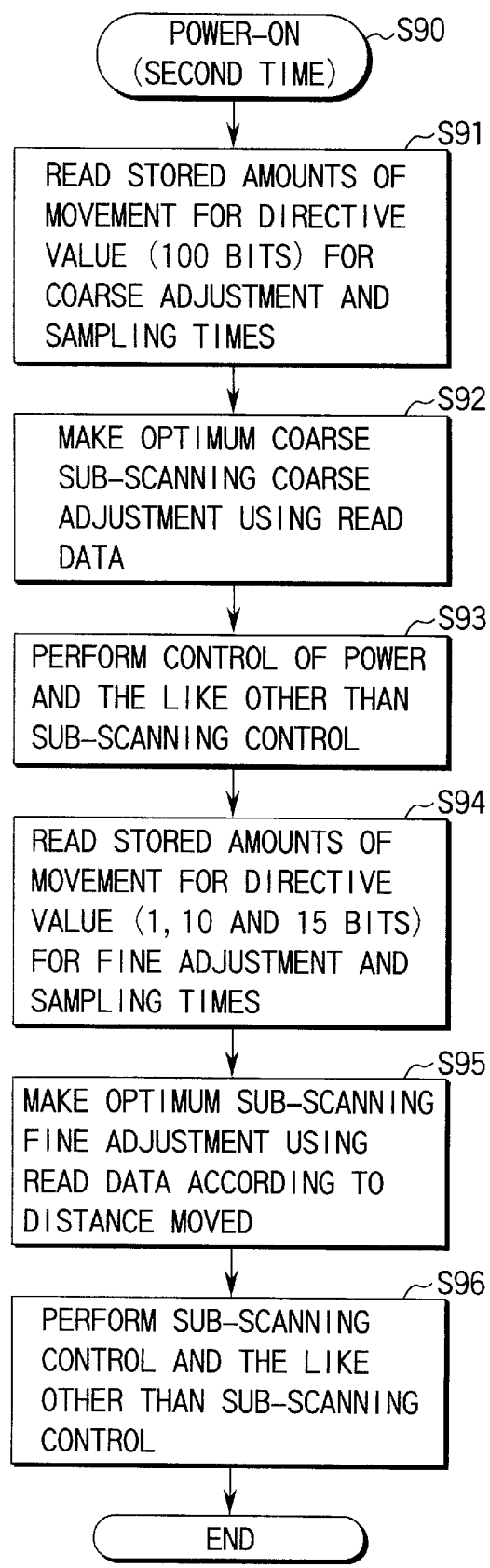
FIG. 16 is a flowchart for multi-beam control using measured data according to the present invention.
Figure 17A:
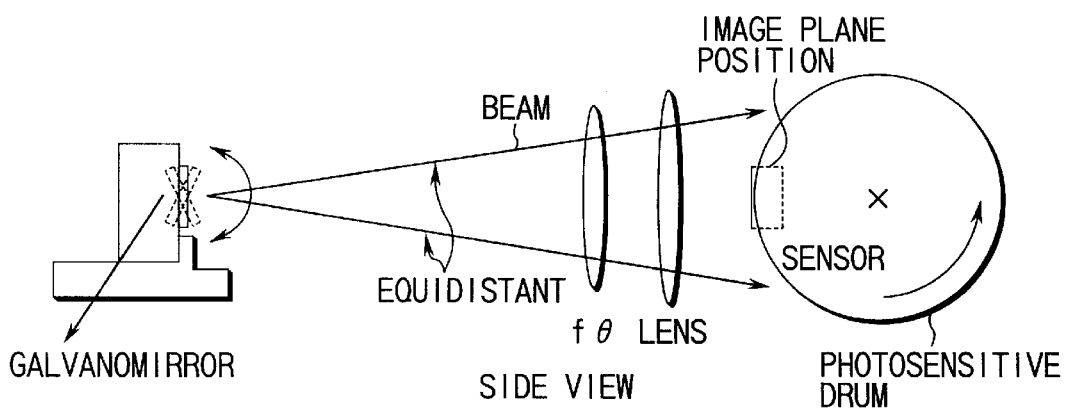
FIGS. 17A and 17B are diagrams for use in explanation of the image plane position.
Figure 17B:
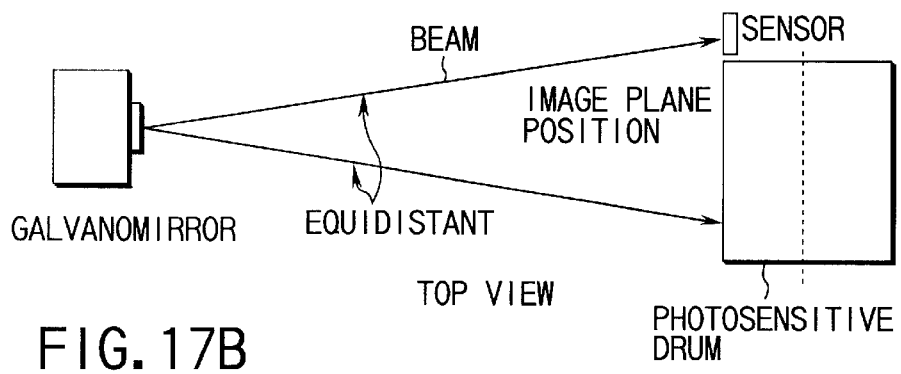

Next, when the power is turned on and after a second time in the digital copying apparatus, control is performed to conform to the characteristics of the individual galvanomirrors using the distances moved for the directive values and the sampling times at which the sensor outputs corresponding to 70% and 90% movement are obtained. FIG. 16 is a flowchart for a control method using such measured data.

Figure 18:
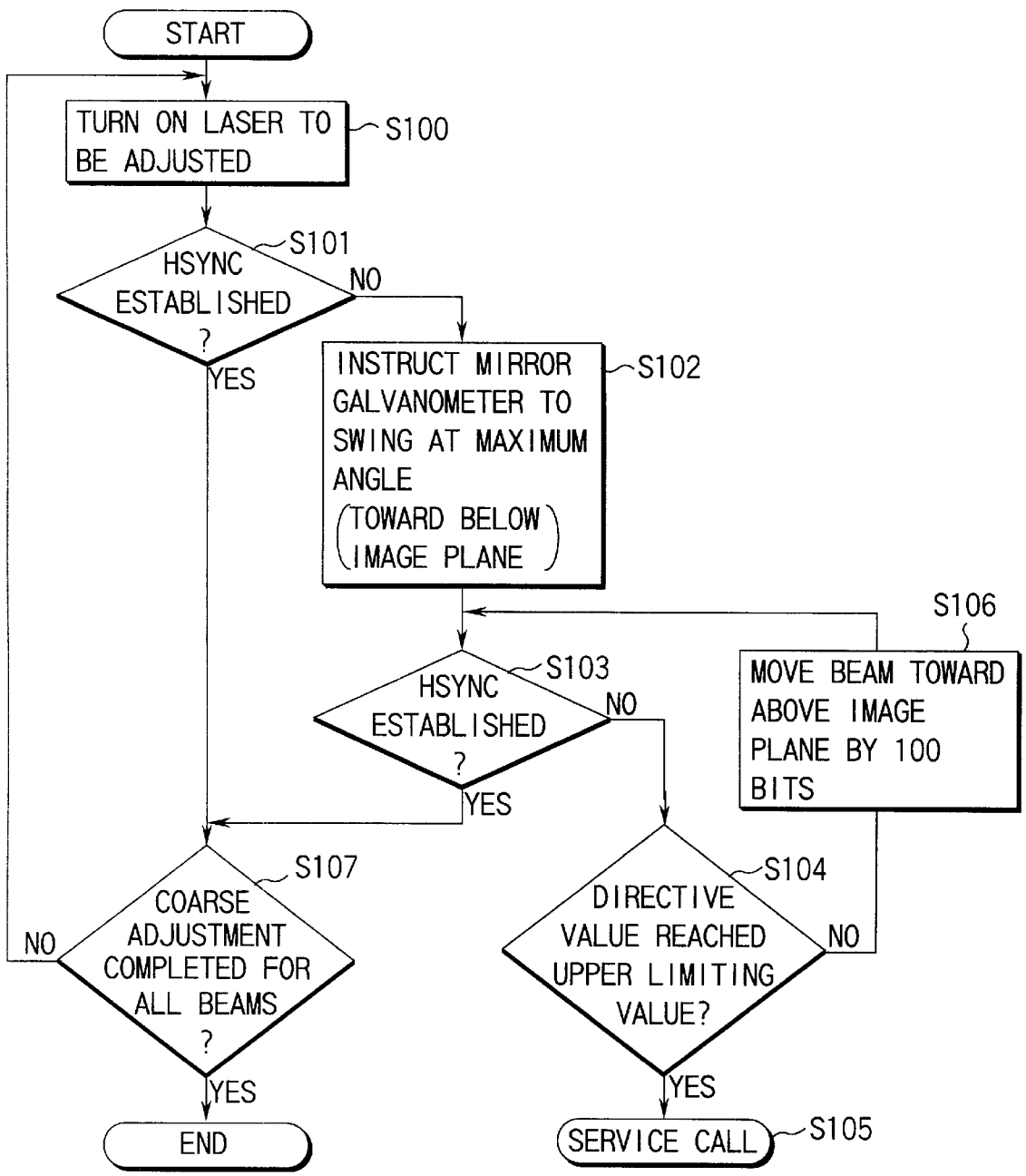
FIG. 18 is a flowchart for conventional multi-beam sub-scanning coarse adjustment.
Figure 20:
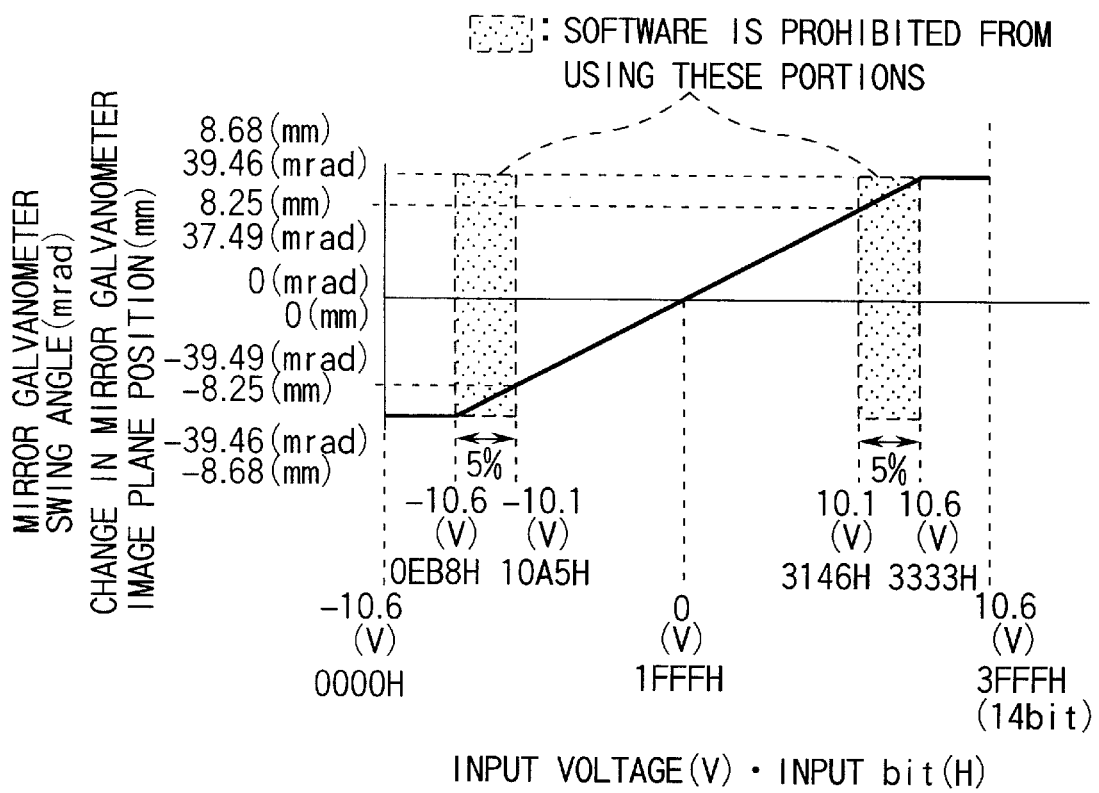
FIG. 20 illustrates the input-output characteristic of a galvanomirror.
Figure 21:
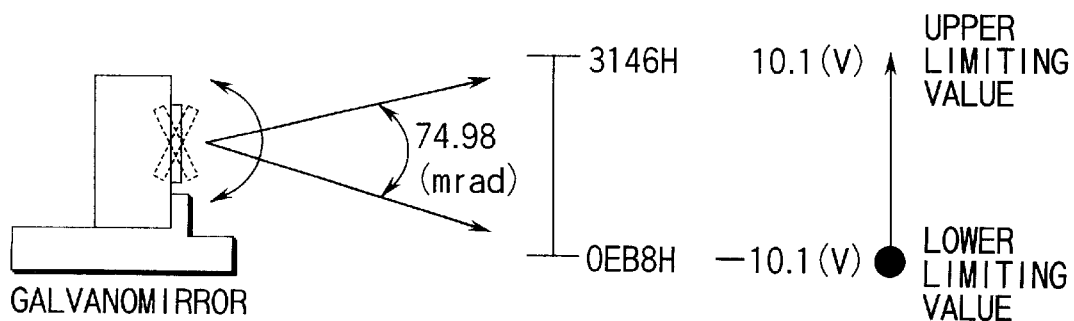
FIG. 21 is a diagram for use in explanation of the input-output characteristic of a galvanomirror.
Figures 22, 23:
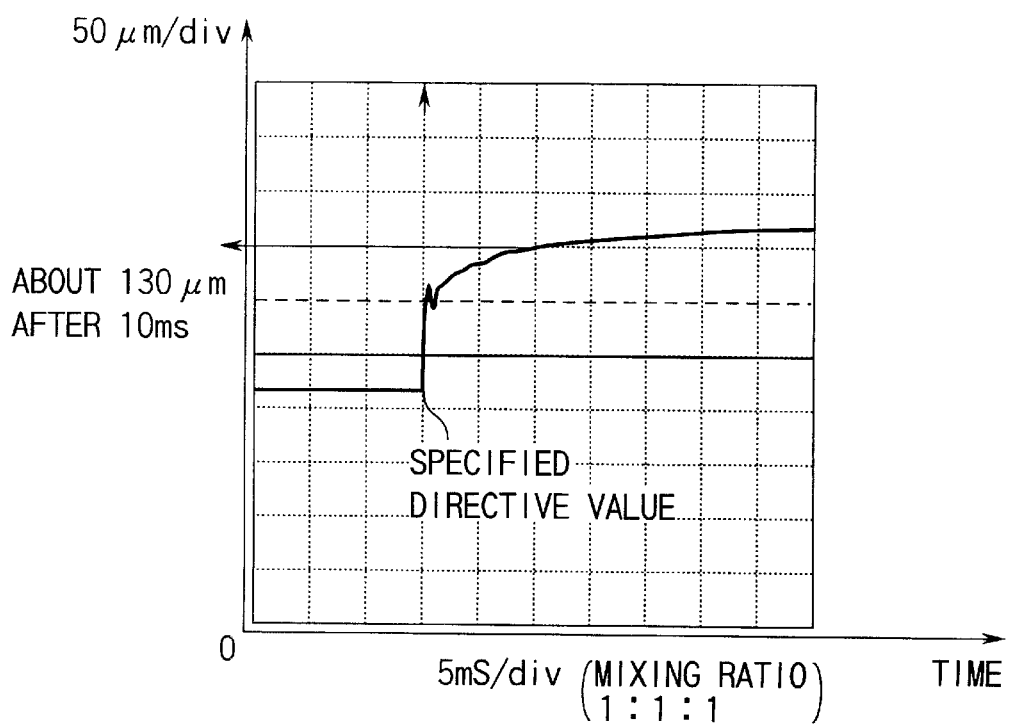
FIG. 22 illustrates the operational specification of a galvanomirror.
FIG. 23 illustrates the response characteristic of a galvanomirror.
Figure 24:
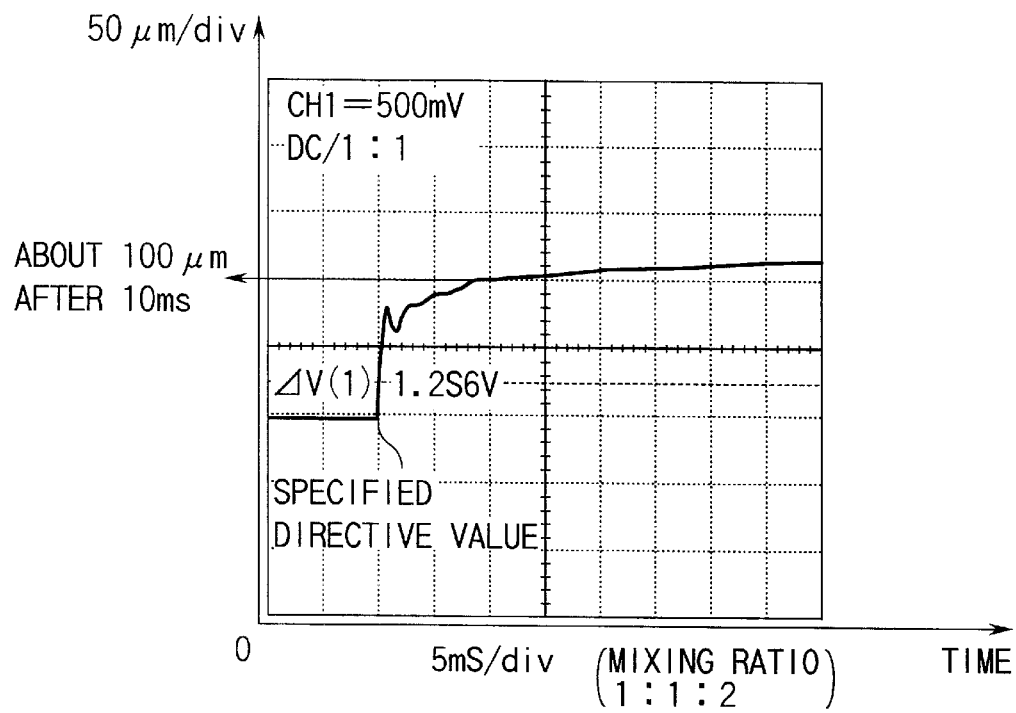
FIG. 24 illustrates the response characteristic of a galvanomirror.
Figure 25:
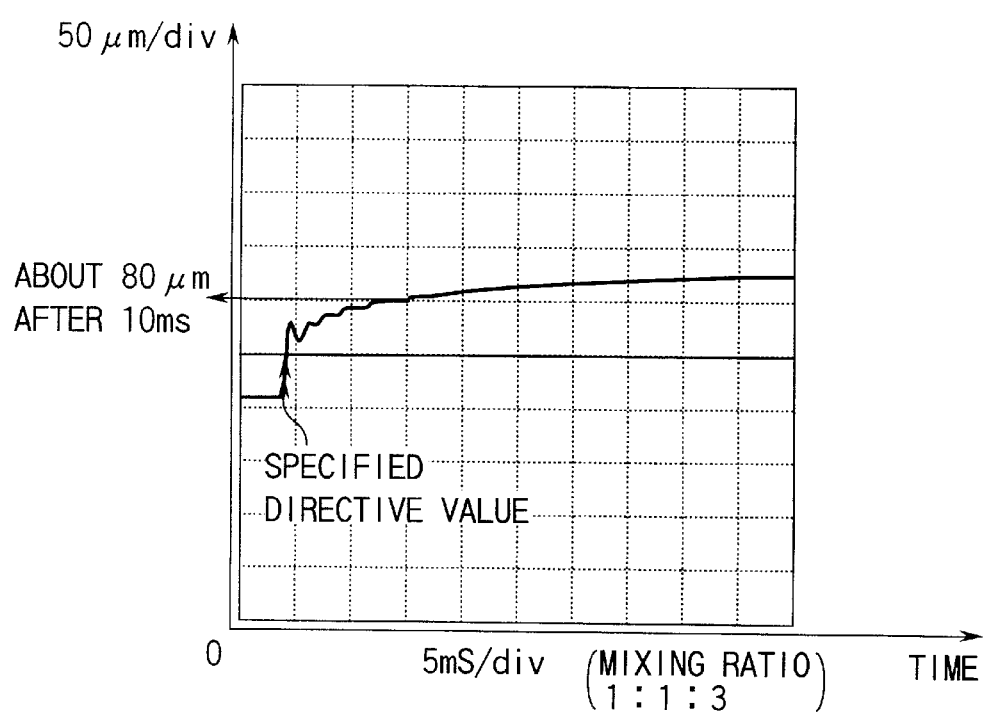
FIG. 25 illustrates the response characteristic of a galvanomirror.

For example, if, at the time of measurement, the galvanomirror (image plane position) moves only 150 μm one second after 100 bits was given as a directive value and 90 mS is taken to move 90% of the change in the image plane position for that directive value, then a directive value for moving the galvanomirror in units of 200 μm is given in coarse adjustment. That is, the directive value is set to 148 bits (100×200/150), not to 100 bits and a coarse adjustment is made at a sampling time of 90 mS as in the case of FIG. 18.

Figure 19:
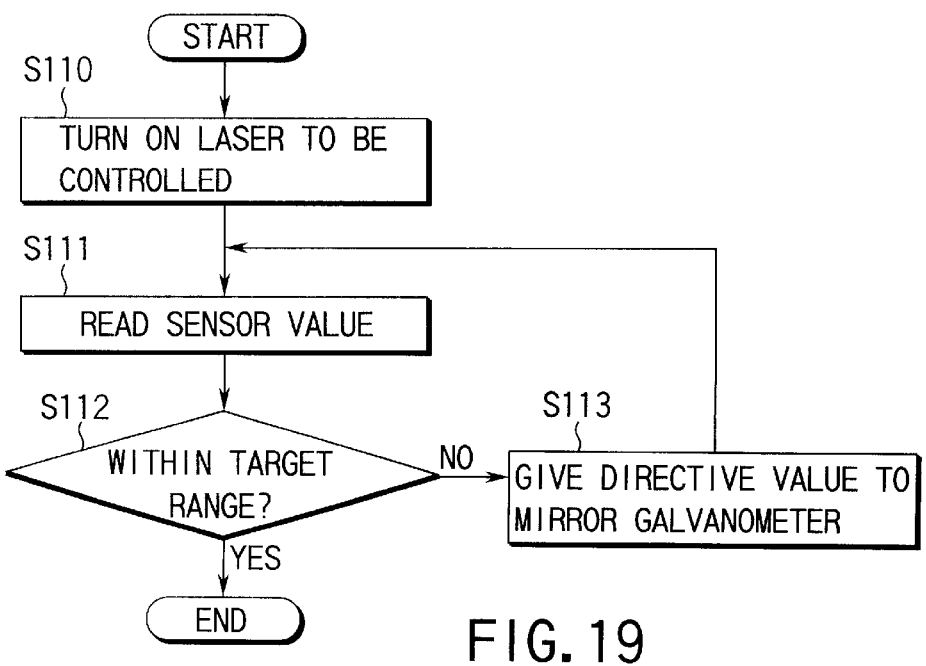
FIG. 19 is a flowchart for conventional beam position fine adjustment.

If, at the time of measurement, the galvanomirror moves as long as 40 μm one second after 15 bits was given as a directive value and 10 mS is taken to move 90% of the change in the image plane position for that directive value, then a directive value for moving the galvanomirror in units of 30 μm is given in coarse adjustment. That is, the directive value is set to 11 bits (15×30/40) and a coarse adjustment is made at a sampling time of 10 mS as in the case of FIG. 19. The same is performed for directive values of 10 bits and 1 bit.

The directive values, 15 bits, 10 bits and 1 bit, are selectively used according to the width of movement required during control. For example, data when the directive value is 15 bits are used for large movement at the beginning of fine adjustment and data when the directive value is 1 bit are used on the last stage of control.

As described above, by performing control to conform to the characteristics of the individual galvanomirrors, each beam can be driven into a target point in minimum steps. Therefore, the problem of overshoot and shortness of movement of the galvanomirrors can be eliminated and the control efficiency can be increased greatly.

In addition, a change in the image plane position for a directive value and the response time of each galvanomirror can be known to estimate the total control time. For this reason, the idle running time of the drum can be reduced and waste of time can be prevented in the control of the entire multi-beam copying apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. For use with an image forming apparatus including multiple laser sources, a single polygon mirror, galvanomirrors, and a laser beam position detecting optical sensor, a method for controlling the sub-scanning direction beam position comprising the steps of:

controlling the galvanomirror with a last galvanomirror directive value of the galvanomirror which corresponds to the directive value for which a drift correction was performed during sub-scanning beam position control at the time of the last operation of the image forming apparatus;

estimating the drift direction of the galvanomirror on a basis of drift characteristics of the galvanomirror based on the last directive value, when the sub-scanning direction beam position has not reached an optical detecting range of the optical sensor with the last directive value;

providing a directive value to the galvanomirror so that the sub-scanning direction beam position is moved in predetermined sizes from the position corresponding to the last directive value toward the estimated direction;

determining whether the directive value provided to the galvanomirror has reached a predetermined value; and providing directive values to the galvanomirror so that the sub-scanning direction beam position is moved in the predetermined sizes from the position corresponding to the last directive value toward the direction opposite to the estimated direction, when the directive value has reached the predetermined value.

2. The method according to claim 1, wherein the estimating step includes a step of, when the last directive value is plus, estimating the drift direction to be the plus direction and, when the last directive value is minus, estimating the drift direction to be minus.

3. For use with an image forming apparatus including multiple laser sources, a single polygon mirror, galvanomirrors, and laser beam position detecting optical sensors, a method for controlling the sub-scanning direction beam position comprising the steps of:

measuring a movement amount of a beam after predetermined directive value used for an adjustment in the sub-scanning direction has been provided to the galvanomirror at regular time intervals using changes in outputs of the sensors;

determining a final movement amount of the beam from a measurement result of the movement amount and determining response times of the galvanomirror for the directive value from the determined final measurement amount; and controlling the beam position in the sub-scanning direction using the final movement amount of the beam and the response time for the directive value.

4. The method according to claim 3, wherein the determining step includes a step of determining a movement amount of the beam one second after the predetermined directive value was provided to the galvanomirror as the final movement amount of the beam for the directive value to the galvanomirror.

5. The method according to claim 3, wherein the determining step includes a step of determining a time at which the movement amount of the beam reaches 70% of the final movement amount of the beam for the directive value to the galvanomirror as the response time for fine adjustment.

6. The method according to claim 3, wherein the determining step includes a step of determining a time at which the movement amount of the beam reach 90% of the final movement amount of the beam for the directive value to the galvanomirror as the response time for coarse adjustment.

7. The method according to claim 3, wherein the step of controlling the beam position includes a step of making fine adjustment of the beam position, and the fine adjustment step further includes a step of turning on a beam to be controlled and scanning the beam in the main scanning direction, a step of deciding the sub-scanning direction position of the beam by reading the outputs of the optical sensors, a step of, when the sub-scanning direction position is not within a target range, calculating a specific directive value on the basis of the final movement amount of the beam for the directive value and providing the specific directive value to the corresponding galvanomirror, and a step of deciding the sub-scanning direction position of the beam to be controlled after the response time for fine adjustment since the specific directive value was provided to the galvanomirror.

8. The method according to claim 3, wherein the step of controlling the beam position further includes a step of making coarse adjustment of the beam position, and the coarse adjustment step comprises the steps of:

controlling the galvanomirror with the last directive value of the galvanomirror which corresponds to the directive value for which a drift correction was performed during sub-scanning beam position control at the time of the last operation of the image forming apparatus;

deciding whether the sub-scanning direction beam position has reached an optical detecting range of the optical sensor by referring to output value of the sensor;

estimating the drift direction of the galvanomirror on a basis of drift characteristics of the galvanomirrors based on the last directive value, when the sub-scanning direction beam position has not reached the laser detecting range of the optical sensor with the last directive value;

providing directive value to the galvanomirror so that the sub-scanning direction beam position is moved in predetermined sizes from the position corresponding to the last directive value toward the estimated direction;

deciding whether the directive value provided to the galvanomirror has reached a predetermined value; and providing directive value to the galvanomirror so that the sub-scanning direction beam position is moved in the predetermined sizes from the position corresponding to the last directive toward the direction opposite to the estimated direction, when the directive value has reached the predetermined value.

9. For use with an image forming apparatus including multiple laser sources, a single polygon mirror, galvanomirrors, and laser beam position detecting optical sensors, a method for controlling the sub-scanning direction beam position comprising the steps of:

measuring a final movement amount of a beam after a predetermined directive value used for measurement has been provided to the galvanomirror at regular time intervals using changes in outputs of the optical sensors;

determining a final movement amount for the predetermined directive value for the measurement of the galvanomirror in accordance with a measurement result of the regular time intervals;

determining a time required by a laser beam to move between two optical sensors arranged with a predetermined interval, after the predetermined directive value used for measurement has been provided to the galvanomirror, by measuring the time interval between output peaks of the two optical sensors;

determining a movement amount and a response time for a plurality of directive values having each different value used for adjustment in the sub-scanning direction on the basis of the time required by the laser beam to move between the two optical sensors and the final movement amount for the predetermined directive value for the measurement; and controlling the beam position in the sub-scanning direction using the final movement amount and the response times for the plurality of the directive values having each different value used for the adjustment in the sub-scanning direction.

10. A method according to claim 9, wherein the determining unit determines a time at which the movement amount of the beam has reached 70% of the final movement amount for the directive value of the galvanomirror as a response time for a fine adjustment for the directive value.

11. A method according to claim 9, wherein the determining unit determines a time at which the movement amount of the beam has reached 90% of the final movement amount for the directive value of the galvanomirror as a response time for a course adjustment for the directive value.

12. An image forming apparatus including multiple laser sources, a single polygon mirror, and a galvanomirror for controlling the sub-scanning direction beam position, comprises:

a control unit which controls the galvanomirror with a last directive value of the galvanomirror which corresponds to the directive value for which a drift correction was performed during sub-scanning beam position control at the time of the last operation of the image formation apparatus;

a deciding unit which decides whether the sub-scanning direction beam position has reached a target range;

an estimating unit which estimates a drift direction of the galvanomirrors on a basis of drift characteristics of the galvanomirrors based on the last directive value, when the sub-scanning direction beam position has not reached an optical detecting range of the optical sensor with the last directive value;

a first providing unit which provides directive values to the galvanomirror so that the sub-scanning direction beam position is moved in predetermined sizes from the position corresponding to the last directive value toward the estimated direction;

a determining unit which determines whether the directive value provided to the galvanomirror has reached a predetermined value; and a second providing unit which provides directive values to the galvanomirror so that the sub-scanning direction beam position is moved in steps from the position corresponding to the last directive value in the direction opposite to the estimated direction, when the directive value has reached the predetermined value.

13. An image formation apparatus including multiple laser sources, a single polygon mirror, optical sensors for sensing a position of laser beam, and a galvanomirror for controlling sub-scanning beam position, comprising:

a measuring unit which measures a final movement amount of a beam after a predetermined directive value used for an adjustment of the sub-scanning direction has been provided to the galvanomirror at regular time intervals using changes in outputs of the optical sensors;

a determining unit which determines a movement amount for the predetermined directive value of the galvanomirror in accordance with a result of the measured regular time intervals;

a determining unit which determines the time required by the laser beam to move between two optical sensors arranged with a predetermined interval, after the predetermined directive value used for the adjustment of the sub-scanning direction has been provided to the galvanomirror, by measuring the time interval between output peaks of the two optical sensors;

a determining unit which determines a movement amount and a response time, for a plurality of directive values having each different value on the basis of the time required by the laser beam to move between the two optical sensors and the final movement amount for the predetermined directive values; and a controlling unit which controls the beam position in the sub-scanning direction using the final movement amount and the response times for the plurality of the directive values having each different value.

* * * * *